US006241355B1

(12) United States Patent
Barsky

(10) Patent No.: US 6,241,355 B1
(45) Date of Patent: Jun. 5, 2001

(54) COMPUTER AIDED CONTACT LENS DESIGN AND FABRICATION USING SPLINE SURFACES

(76) Inventor: Brian A. Barsky, 2037 Melvin Rd., Oakland, CA (US) 94602

(*) Notice: Subject to any disclaimer, the term of this patent is extended or adjusted under 35 U.S.C. 154(b) by 0 days.

(21) Appl. No.: 08/825,485

(22) Filed: Mar. 28, 1997

Related U.S. Application Data

(60) Provisional application No. 60/014,354, filed on Mar. 29, 1996.

(51) Int. Cl.[7] ................................................. G02C 7/04
(52) U.S. Cl. ................................... 351/177; 351/160 R
(58) Field of Search .......................... 351/160 R, 160 H, 351/161, 162, 177

(56) References Cited

U.S. PATENT DOCUMENTS

| | | | |
|---|---|---|---|
| 5,114,628 | * 5/1992 | Hofer et al. | 264/1.4 |
| 5,452,031 | 9/1995 | Ducharme | 351/177 |
| 5,502,518 | * 3/1996 | Lieberman | 351/160 R |

OTHER PUBLICATIONS

Barsky, Brian A.; DeRose, Tony D., "Deriving the Beta–constraints for Geometric Continuity of Parametric Curves," in "Rendiconti del Seminario Matematico e Fisico di Milano" vol. LXIII (1993), edited by D. Roux, O. Svelto, L. Gotusso, Ambracinque, Milan, 1995.*

Hohmeyer, Michael E.; Barsky, Brian A., "Rational Continuity: Parametric, Geometric, and Frenet Frame Continuity of Rational Curves", ACM Transactions on Graphics, vol. 8, No. 4, Oct. 1989, pp. 335–339.*

Klein, Stanley A.; Barsky, Brian A., "Method for Generating the Anterior Surface of an Aberration–free Contact Lens for an Arbitrary Posterior Surface", Optometry and Vision Science, vol. 72, No. 11, Nov. 1995, pp. 816–820.*

Korb, Donald R.; Korb, Joan E., "A New Concept in Contact Lens Design", Journal of the American Optometric Association, vol. 41, No. 12, Dec. 1970, pp. 1023–1032.*

* cited by examiner

Primary Examiner—Scott J. Sugarman

(57) ABSTRACT

A method of computer-aided contact lens design and fabrication uses spline-based mathematical surfaces without restrictions of rotational symmetry. The spline encompasses any piecewise function with any associated constraints of smoothness or continuity. The method comprises some or all of the following steps: data acquisition, three-dimensional mathematical surface model construction, posterior surface description, ray tracing for anterior surface, and peripheral edge system (PES) design. The result is a mathematical or algorithmic description of a contact lens. Based on the more powerful mathematical representation of splines, these contact lenses can have posterior surfaces that provide a good fit to corneas having complicated shapes. This enables the design and fabrication of lenses (including soft lenses) with good optics for irregularly shaped corneas.

20 Claims, 42 Drawing Sheets

47 46 48

46 48 47 49

Fig. 9(iii)

Fig. 20(iii)
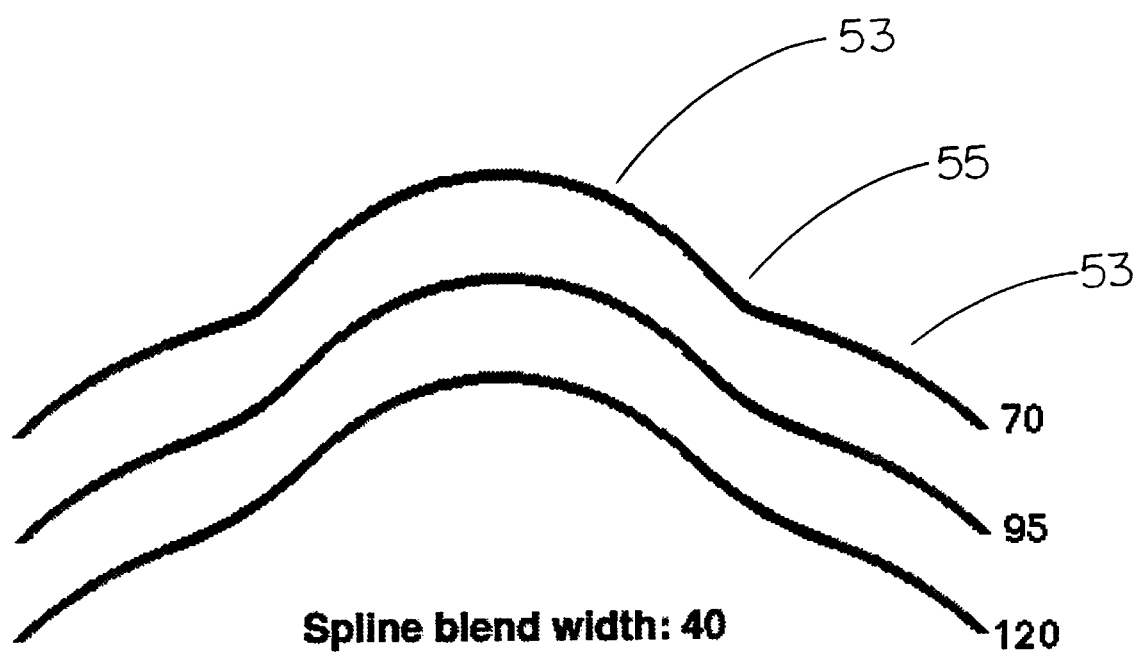

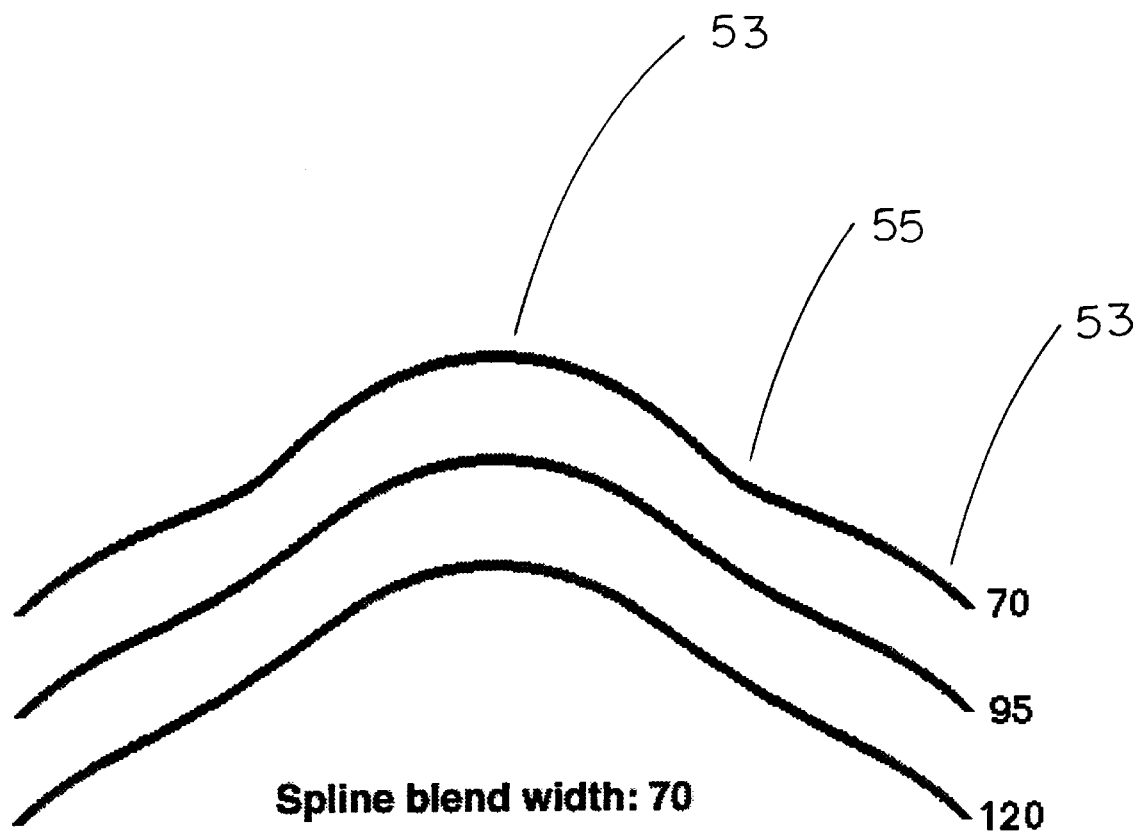

COMPUTER AIDED CONTACT LENS DESIGN AND FABRICATION USING SPLINE SURFACES

RELATED APPLICATION

This application claims the benefit of Provisional Patent Application, Serial No. 60/014,354 filed on Mar. 29, 1996.

FIELD OF THE INVENTION

This invention relates generally to the design and fabrication of contact lenses, and in particular to a method using spline-based mathematical surfaces without restrictions of rotational symmetry.

BACKGROUND OF THE INVENTION

Besides the obvious cosmetic aspect, contact lenses generally offer improved visual acuity compared to spectacles. In some cases, the difference is dramatic. For example, in the case of the corneal pathology of keratoconus (a corneal condition in which there is local region of high curvature), contact lenses can often succeed in providing excellent visual acuity (perhaps 20/20 using the standard Snellen eye chart) whereas spectacles are not able to provide more than a minor improvement over the uncorrected vision. In addition to improved visual acuity, contact lenses are also indicated for other diverse purposes, such as a medicine delivery system or as a "bandage" for protection of the cornea after erosion, trauma, or surgery.

Current contact lenses have shapes formed from relatively simple geometries, mostly spherical of different radii, or conic sections, etc. Consequently, there are many limitations, including poor fit for corneas with complex shape (such as might be found in keratoconus or in post-surgical corneas), edges that are uncomfortable, limited optical correction, limited ballasting/stabilization designs (for orientation of non-rotationally symmetric lenses), etc.

The most complex designs of the anterior or posterior surface of a contact lens are based on two or three surface zones. They are usually spherical, or sometimes so-called "aspherical". Although "aspherical" literally means "not a sphere", this term is used more narrowly in the contact lens field to refer to what mathematicians call surfaces of revolution of conic sections or toric surfaces.

Most contact lenses are either lathed directly, or molded from molds that were produced from pins and inserts that were lathed or ground. The lathing and grinding technology that is commonplace in the contact lens industry produces rotationally-symmetric lenses (except for toric lenses for astigmatism which are generally produced by a rather ad-hoc "crimping" method) and the shapes are fairly simple geometrically. In order to realize more general shapes, more sophisticated fabrication techniques are necessary. Computer numerical control (CNC) machining moves a cutting tool along a path on a part according to a mathematical model. The concept is that the computer instructs the machine how to make the complex shape, and the machine is capable of making such a shape. Furthermore, such high accuracy is achieved that the usual requirements of polishing the scallops (ridges) is greatly reduced or even eliminated. Some CNC machines can produce contact lenses that are non-rotationally symmetric.

There is a widely-held precept that making custom shapes is impractical and costly—that "one size fits all" is the only economical method. The advent of CNC machining shatters some deeply-held beliefs about manufacturing. In the traditional manufacturing process, the notions of mass production and economies of scale are predicated on the assumption of producing many identical copies of a product; but these ideas date from the industrial revolution. "Any color as long as it is black" is a Model T concept. Nowadays, automobiles are manufactured efficiently despite the fact that each one that rolls out of the factory door has a unique permutation of a dizzying array of options. Mass customization can be realized by integrating computers into the manufacturing process such that each contact lens can be automatically produced to custom specifications; the computer simply uses the particular set of values of the parameters of the mathematical model for each unit. Concerns about minimizing the number of different stock keeping units (SKU's) could be a thing of the past by embracing concepts of just in time manufacturing.

Although CNC machines enable the fabrication of complex surfaces, and the variation from one unit to the next, they require that a powerful mathematical model be used. In the evolution from traditional manual machining to automated CNC technology, all details must be specified completely and precisely.

PRIOR ART

U.S. Pat. No. 5,452,031, Sep. 19, 1995, to Christopher A. Ducharme of Boston Eye Technology, Inc. perpetuates the classic concept of a surface of revolution of a curve and is restricted to rotationally symmetric surfaces. Ducharme uses the word "spline" in a narrow sense, which will be further explained later, of a piecewise cubic function with continuity of position and the first two derivatives, and that patent does not include any broader mathematical specifications. He describes the use of the spline only for the peripheral zone, not for the optic zone. Furthermore, Ducharme does not address the determination of the optics for the lens in the case of a spline-based design. Although he mentions thickness, he does not provide any information that would enable someone to design a lens to achieve desired optics. He describes only a spline that joins the optic zone with $C^1$ (first derivative) continuity. Ducharme's discussion is limited to $C^1$ continuity with the optic zone because it is simply implementing the so-called "clamped" spline, and provides no indication whatsoever of more sophisticated mathematics to transcend such limitations on the level of continuity. His discussion is limited to polynomials. Ducharme assumes that the lens must be lathe cut.

A related international application, PCT/US94/10354, published Mar. 16, 1995, of David M. Lieberman is restricted to contact lenses smaller than the diameter of the cornea. It also only addresses the peripheral portion of the posterior surface. Lieberman does not provide details of the shape. He discusses a simple "brute force" collection of point data with no higher-order mathematical structure developed. He refers to the use of 1500 points to describe the surface. He does not include any mathematical methodology. This lack of mathematical model results in a representation that is unnecessarily large and inefficient.

A related U.S. Pat. No. 5,114,628, May 19, 1992, to Peter Hofer, Peter Hagmann, Gunther Krieg, and Eberhard Vaas of Ciba-Geigy Corporation in Germany shows the manufacture of individually fitted contact lenses from corneal topography but does not provide details of the shape, and does not present any higher-order mathematical description. Like the Lieberman patent, the Hofer et al patent does not include any mathematical methodology.

Note that even a combination of these prior-art references does not provide the physical features of the present application.

OBJECTS AND ADVANTAGES OF THE INVENTION

Accordingly, several objects and advantages of this invention are a more powerful mathematical representation to enable more complex shape description, without restrictions of rotational symmetry, for contact lenses to improve fit, optics, patient comfort, and corneal health.

The very general spline formulations used in this method incorporate many features, including (but not limited to):

- continuity of arbitrarily high order
- geometric continuity as well as parametric continuity
- shape parameters, if desired
- elimination of rotational symmetry restriction
- spline-based optical zone (not constrained to be spherical)
- ability to embed exact spherical zones
- eccentrically-located optical zone
- complex-shaped tear layer gap ("mismatch")
- capability to have non-circular periphery The novel techniques presented here enable the design and fabrication of contact lenses that transcend the state of the art. Based on the more powerful mathematical representation of splines, these contact lenses can have posterior surfaces that provide a good fit to corneas of complicated shapes. This enables the design of lenses (including soft lenses) with good optics for irregularly shaped corneas.

Further objects and advantages of this invention will become apparent from a consideration of the drawings and ensuing description.

BRIEF DESCRIPTION OF THE FIGURES

FIG. 9(i) shows a spline designed elongated edge.

FIG. 9(iii) shows a spline designed blunt edge.

FIG. 9(iv) shows a spline designed Korb style edge.

FIG. 9(vi) shows a spline designed Mandell style edge rotated.

FIG. 20 (ii) shows a small "width" transition zone.

FIG. 20 (iii) shows a medium "width" transition zone.

FIG. 20 (iv) shows a large "width" transition zone.

FIG. 20 (v) shows the transition zone in the same grey level as the adjacent zones.

Figure 1:
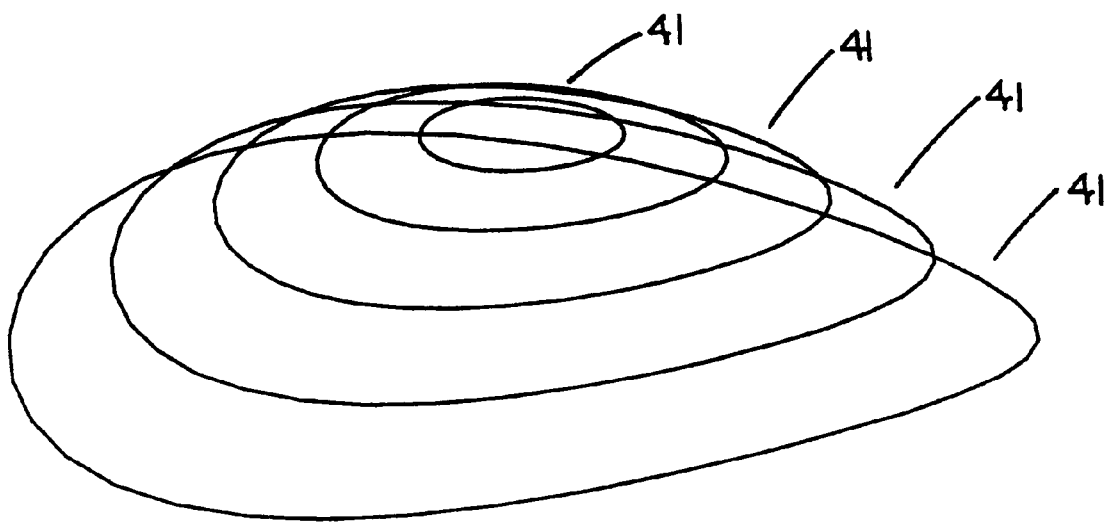
FIG. 1 shows the decomposition of a surface as a sequence of annular regions.

DRAWING REFERENCE NUMERALS 41. annular border
42. radial line
43. center
44. periphery
45. four-sided regions
46. space curve
47. triangular surface elements 48. vertex
49. hexagonal surface element
50. radius of spherical zone
51. center of curvature
52. axis of symmetry
53. conic (elliptical) zones
54. sharp joint
55. transition zone
56. anterior surface
57. posterior surface
58. peripheral edge system (PES)
59. arbitrary surface element

SUMMARY OF THE INVENTION

This invention provides a general mathematical description, without restrictions of rotational symmetry, of the anterior surface (including the optic zone), posterior surface, and peripheral edge system (PES) of a contact lens. FIG. 21 shows contact lenses using spline-based mathematical geometry to describe the anterior surface, posterior surface, and peripheral edge system (PES). In each of FIGS. 21a, 21b, 21c, and 21d, a contact lens is depicted in exploded view, showing the constituent parts of the anterior surface 56, posterior surface 57, and peripheral edge system (PES) 58. Each of these components is divided into a collection of smaller pieces, joined together with mathematical constraints of smoothness. Note that the decomposition into smaller pieces can be done in a different manner for each of these components.

DETAILED DESCRIPTION OF THE INVENTION

In this application, we use more powerful and general spline-based mathematical geometry to describe the anterior surface (including the optic zone), posterior surface, and peripheral edge system (PES) of a contact lens. Splines can represent very general and complex shapes in a compact and efficient manner. The word "spline" was originally used to refer to a plastic or wooden lath that is flexible and is used by a draftsperson to produce a smooth curve through a set of points. This physical spline can be modeled mathematically, producing a piecewise cubic function with continuity of position and of the first two derivatives; this mathematical model is also referred to as a "spline".

Splines are a rich area of mathematics and there is a wide variety of different kinds of splines, each possessing advantages and disadvantages. In the present application, the word "spline" is used to refer to a wider class of mathematical functions than what would arise from the mathematical modeling of the physical device. Specifically, the word "spline" refers to any piecewise function with any associated constraints of smoothness or continuity (not necessarily measured simply as continuity of derivatives). The pieces themselves are not limited to cubic polynomials; they may be polynomials of any degree, Zernike polynomials (used in optics), or even non-polynomial functions (examples include, but are not limited to, rational, trigonometric, exponential, hyperbolic trigonometric, other transcendental functions, Fourier series, wavelets, etc.).

As an example, without limitation, a useful surface representation is the biquintic B-spline surface, expressed as a weighted average of basis functions:

$$Q(u, v) = \sum_{i=0}^{m-1} \sum_{j=0}^{n-1} V_{ij} B_{ij}(u, v) \qquad (1)$$

where $V_{ij}$ are control vertices and $B_{ij}(u, v)$ are basis functions, which are piecewise polynomials of degree five in each of u and v. (Boldface is used to indicate that the function is vector-valued.) The polynomials are derived so as to be continuous up to the fourth derivative at their boundaries [Bartels, Beatty & Barsky, 1987].

Splines provide a mechanism by which the smoothness between adjacent zones can be accurately specified. The idea is that the pieces are mathematically "stitched" together in such a way that where they join is imperceptible. Furthermore, this can be done with complete mathematical specification and fine precision. In some cases, deliberate discontinuities can be locally introduced if desired (using, for example, multiple knots in nonuniform B-splines).

The constraints of smoothness or continuity can take various forms, and may be relatively simple or complicated. The most common case is that of continuity of position and of the first two derivatives. A more general case is that of continuity of position and of the first n derivatives, for some integer n (where the derivatives may be scalar-valued or vector-valued). However, the constraints can be much more complicated, being expressed by some set of equations (which may be vector-valued). For example, a more complicated analogue of the continuity of position and of the first two derivatives is continuity of position, unit tangent vector, and curvature vector. The surface analogue of this continuity for curves would involve continuity of the tangent plane and osculating sphere. This approach is sometimes referred to as second order geometric continuity [Barsky & DeRose, 1995]. Still more complicated constraints can describe higher order continuity. Furthermore, there are constraints known as "Frenet frame continuity"; this is discussed in [Hohmeyer & Barsky, 1989].

As an example of the form of the constraints, the following are the constraints of fourth order geometric continuity (denoted by $G^4$) for curves:

$$r(0) = q(1) \qquad (2.0)$$

$$r^{(1)}(0) = \beta_1 q^{(1)}(1) \qquad (2.1)$$

$$r^{(2)}(0) = \beta_1^2 q^{(2)}(1) + \beta_2 q^{(1)}(1) \qquad (2.2)$$

$$r^{(3)}(0) = \beta_1^3 q^{(3)}(1) + 3\beta_1 \beta_2 q^{(2)}(1) + \beta_3 q^{(1)}(1) \qquad (2.3)$$

$$r^{(4)}(0) = \beta_1^4 q^{(4)}(1) + 6\beta_1^2 \beta_2 q^{(3)}(1) + (4\beta_1 \beta_3 + 3\beta_2^2) q^{(2)}(1) + \beta_4 q^{(1)}(1) \qquad (2.4)$$

where β2, β3, and β4 are arbitrary, but β1 is constrained to be positive, where superscript (i) denotes the $i^{th}$ parametric derivative, and where q(u), u ∈[0,1], and r(t), t ∈[0, 1] denote two parametrizations meeting at a common point.

In the present application, each piece or zone forms part of a surface. It is important to note that there are no requirements or assumptions of symmetry. Furthermore, this approach does not have the usual restriction that the periphery of the lens be circular. For example, an interesting design would be an oval shape that might facilitate orientation and stabilization for a non-rotationally symmetric lens. Another possibility is to include a truncated portion which would also be useful to help orientation and stabilization.

A special case of this formulation is a surface of revolution, that is, a surface formed by rotating a curve about an axis. Even though this is included in the present formulation, it is a special case. More generally, the present formulation can describe surfaces without constraints of symmetry.

DECOMPOSITION OF THE SURFACE— DESCRIPTION OF FIGS. 1 TO 8

As described in the section entitled "Summary of the Invention", the contact lens comprises the constituent parts of the anterior surface, posterior surface, and peripheral edge system (PES). Each of these components is divided into a collection of smaller pieces, joined together with mathematical constraints of smoothness. Note that the decomposition into smaller pieces can be done in a different manner for each of these components; that is, there is no requirement that all decompositions be of the same form for all the components.

There are many possibilities regarding the decomposition of each surface into smaller pieces. This is know as the "topology" (not "topography") of the surface. This describes the connectivity of the adjacent pieces, without limiting the kind of mathematical surface formulation being used to specify each piece. FIGS. 1 through 8 show, without limitation, some possible arrangements of the pieces:

(1) FIG. 1 shows the pieces as a sequence of annular regions 41, that is, rings.

Figure 2A:
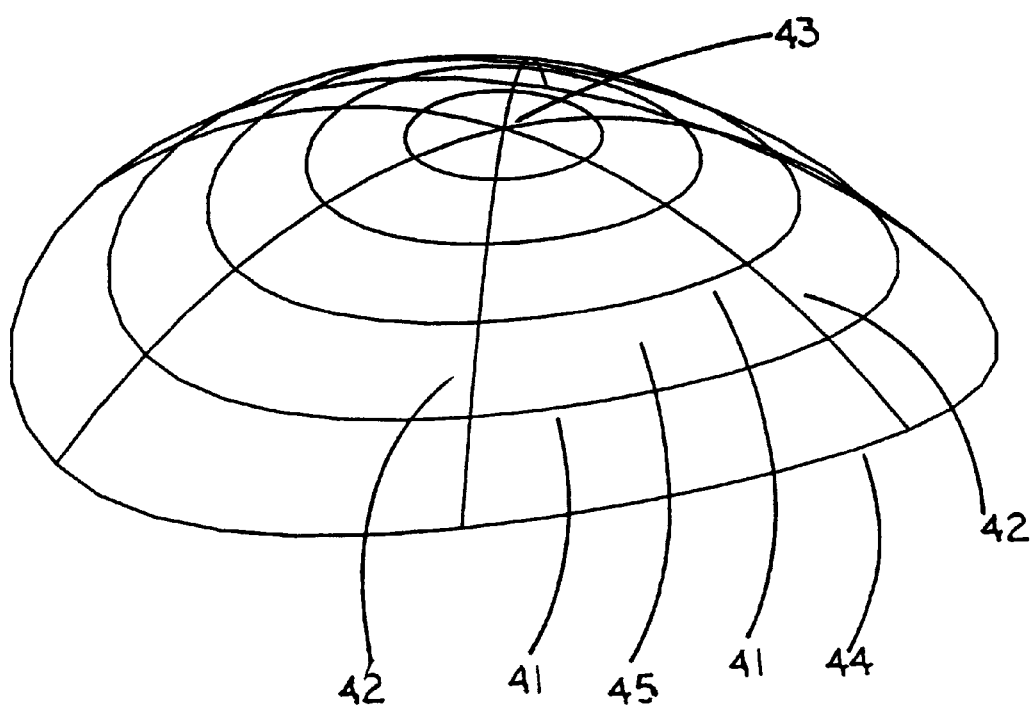
FIG. 2a shows radial lines emanating from the center.

(2a) FIG. 2a shows the aforementioned annuli further subdivided by superimposing a set of radial lines 42, emanating from the center 43, and terminating at the periphery 44, thereby forming a collection of four-sided regions 45, each bounded by two arcs 41 from the rings and two straight lines 42 from the radii.

Figure 2B:
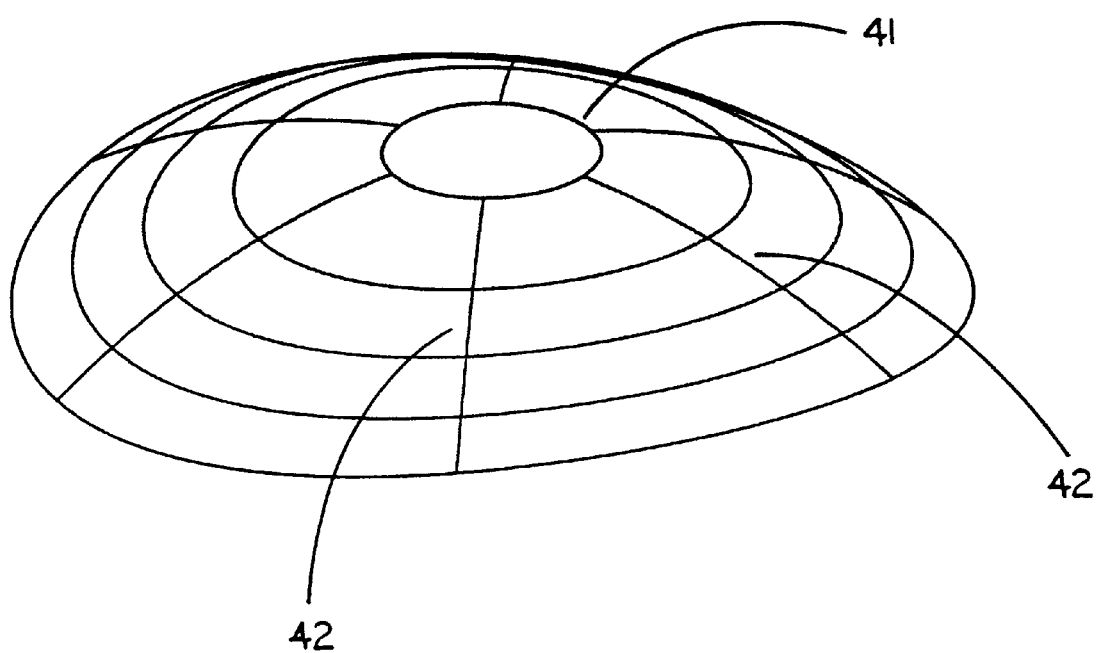
FIG. 2b shows radial lines starting at the same annular border.

(2b) FIG. 2b shows that the set of radial lines 42 discussed in (2a) need not emanate from the center, in this figure, all the radial lines start at the same annular border 41.

Figure 2C:
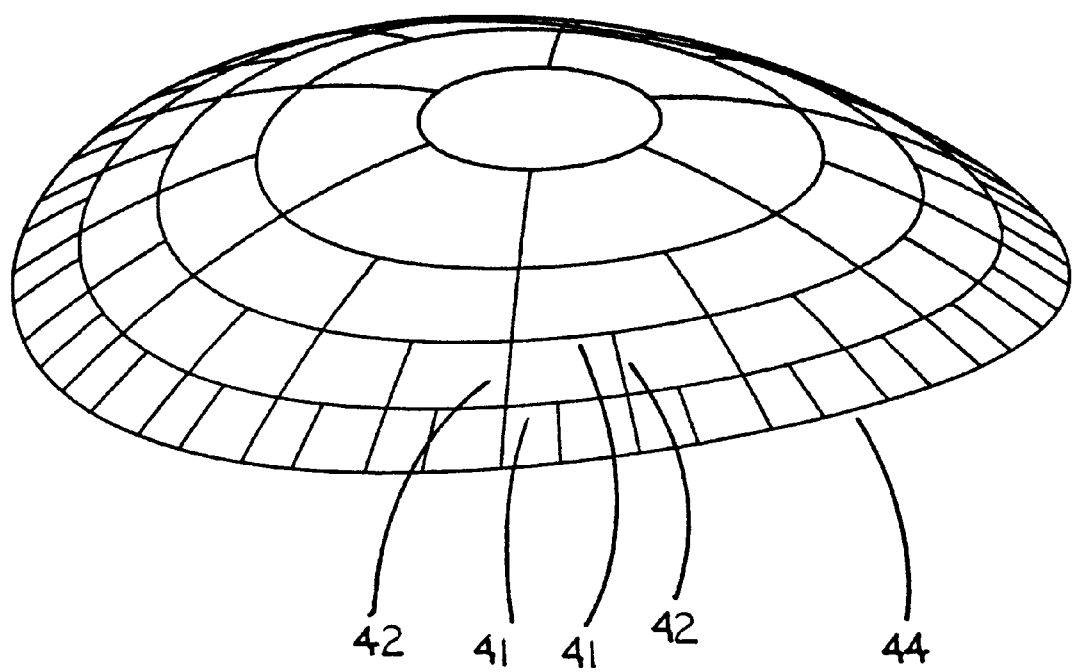
FIG. 2c shows the set of radial lines radial lines emanating from various borders and terminating at the periphery.

(2c) FIG. 2c shows that the set of radial lines 42 discussed in (2a) need not emanate from the center nor all start at the same annular border; in this figure, the radial lines emanate from various borders 41, and terminate at the periphery 44.

Figure 2D:
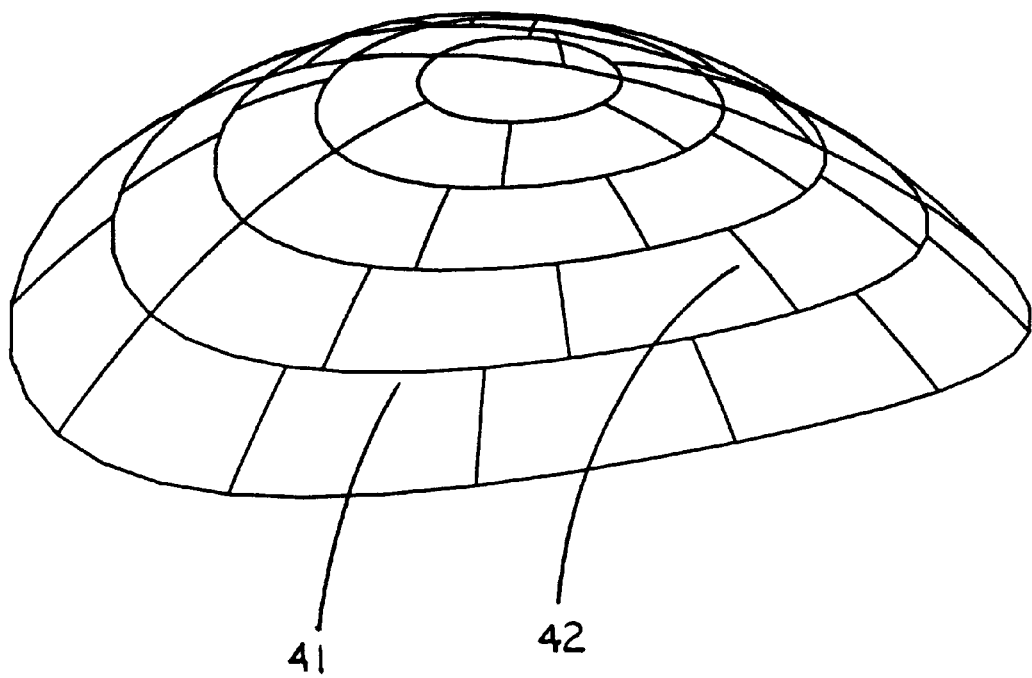
FIG. 2d shows radial lines, each of which may be between any pair of rings.

(2d) FIG. 2d shows that the set of radial lines discussed in (2a) need not emanate from the center, nor start at the same annular border, not continue all the way to the periphery; that is, each radial line 42 may be between any pair of rings 41.

Figure 3:
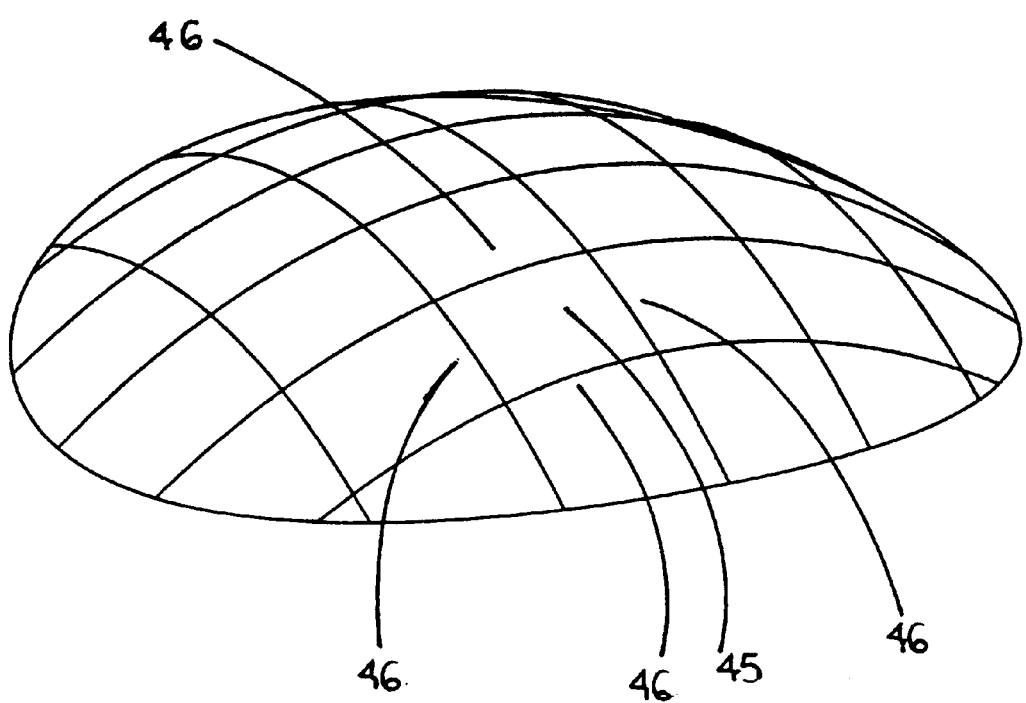
FIG. 3 shows a grid of four-sided regions formed by space curves extending across the entire surface.

(3) FIG. 3 shows a grid of four-sided regions 45, where each region is bounded by four space curves 46, and where each space curve extends across the entire surface.

Figure 4A:
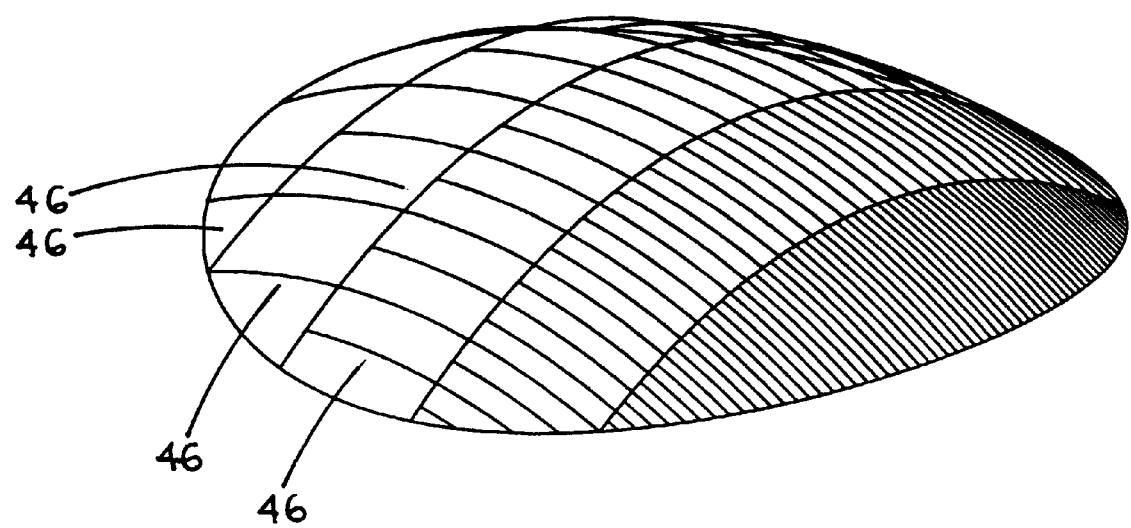
FIG. 4a shows a grid of four-sided regions where the number of such regions increases in each successive strip.

(4a) FIG. 4a shows a variant of the preceding one (FIG. 3) where the space curves 46 in one direction are not required to extend across the entire surface so that the number and size of regions can be adaptive to shape, but where the number of such regions increases in each successive strip.

Figure 4B:
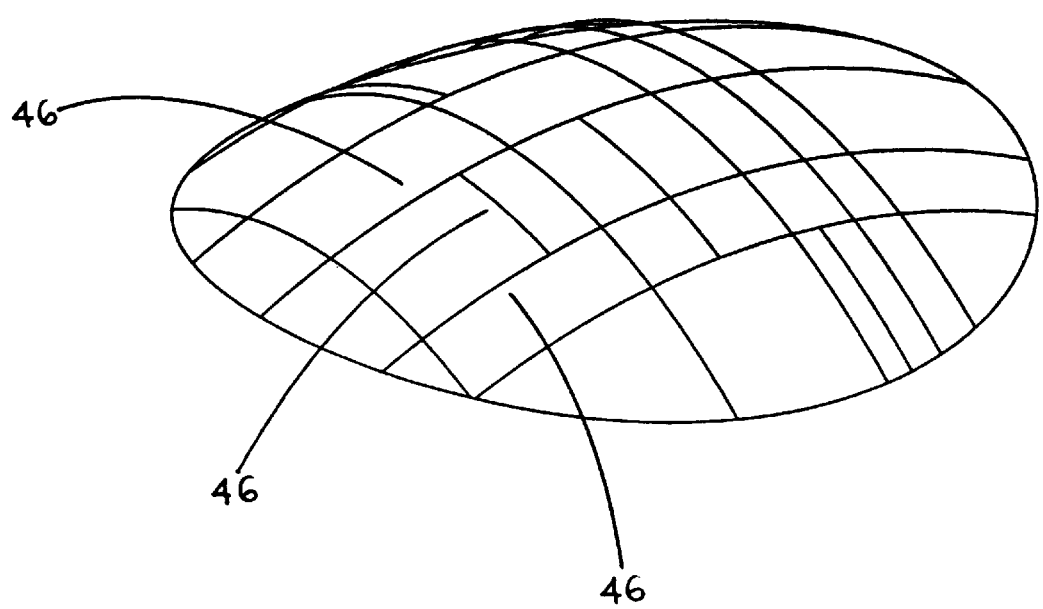
FIG. 4b shows a grid of four-sided regions where the number of such regions in each strip is independent of the number in the adjacent strips.

(4b) FIG. 4b shows a variant of FIG. 4a where the number of such regions in each strip is independent of the number in the adjacent strips; that is, the space curves 46 in one direction may be between any pair of space curves in the other direction.

Figure 5:
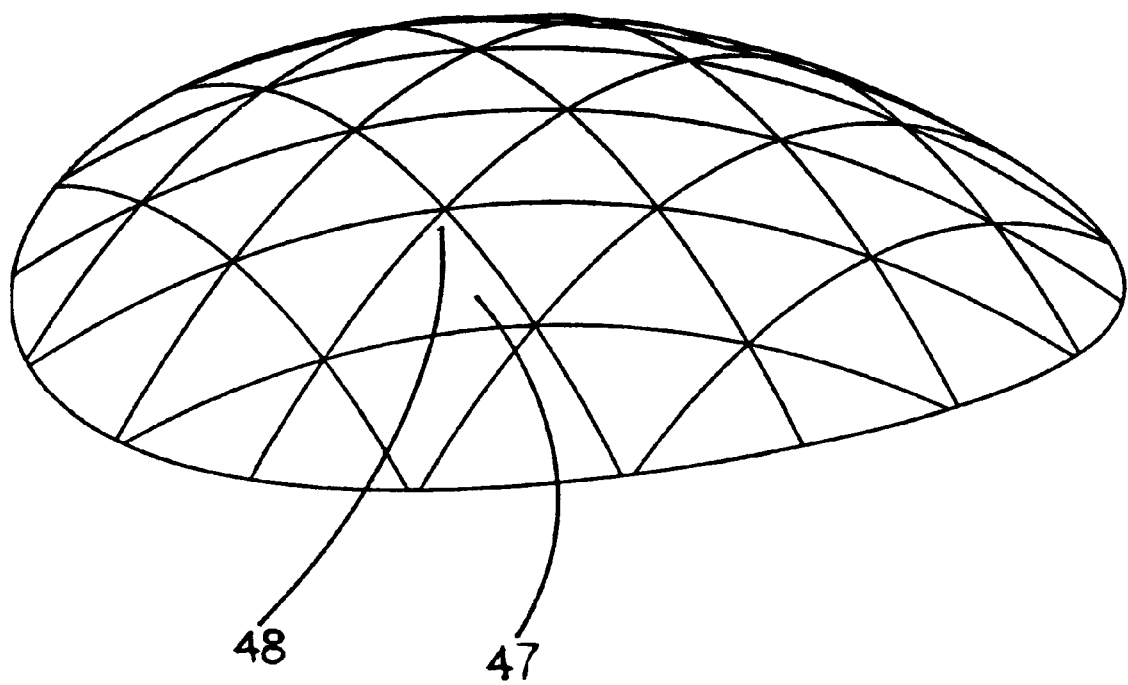
FIG. 5 shows a collection of equilateral triangular surface elements forming a hexagonal grid.

(5) FIG. 5 shows a collection of equilateral triangular surface elements 47, forming a hexagonal grid where all interior vertices 48 have exactly six edges emanating from them.

Figure 6:
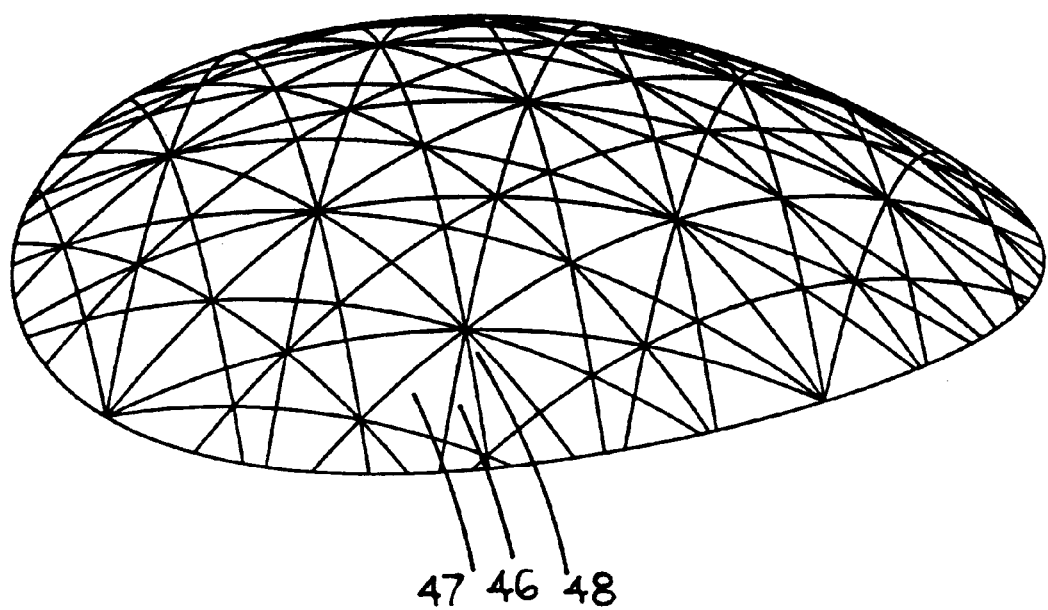
FIG. 6 shows a collection of general triangular surface element.

(6) FIG. 6 shows a collection of general triangular surface elements 47, that is, where each region is bounded by three space curves 46, and where an arbitrary number of edges may emanate from each vertex 48.

Figure 7:
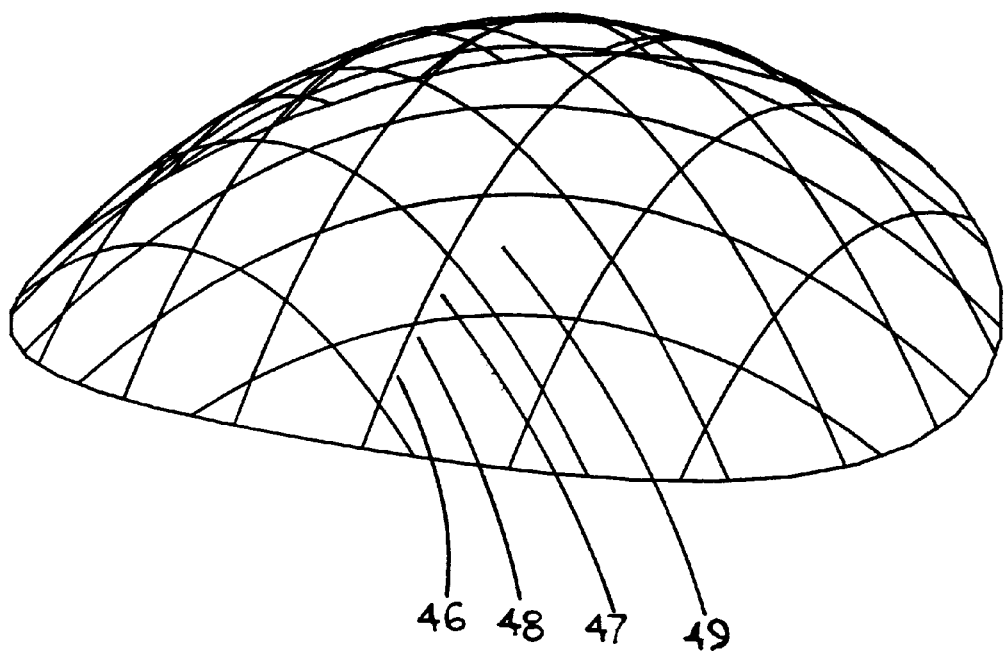
FIG. 7 shows a collection of triangular and hexagonal surface elements.

(7) FIG. 7 shows a collection of triangular 47 and hexagonal 49 surface elements, that is, where each region is bounded by either three or six space curves 46, and four edges emanate from each vertex 48.

Figure 8:
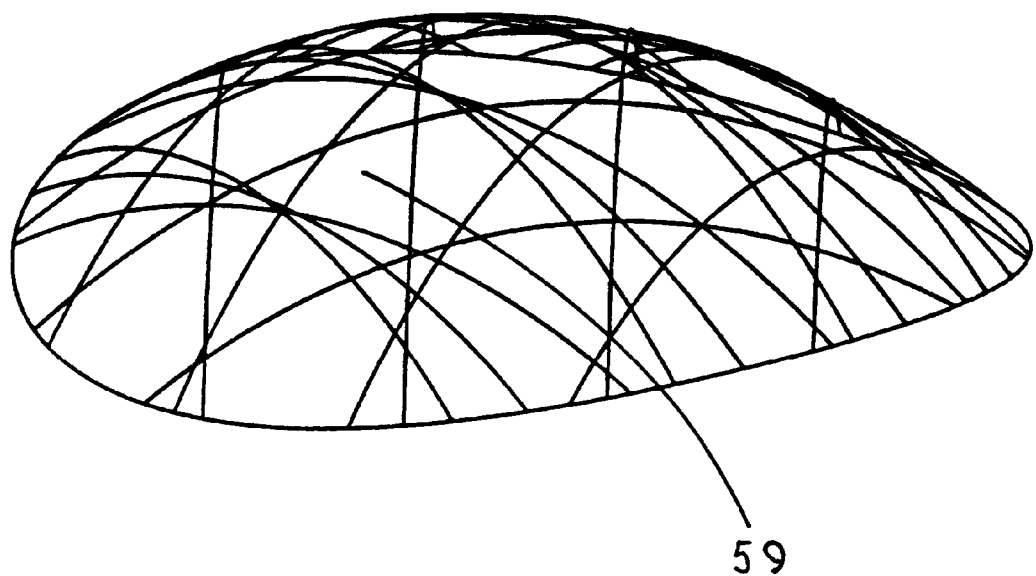
FIG. 8 shows a collection of regions, where each region can have an arbitrary number of sides.

(8) FIG. 8 shows a collection of regions, where each region can have an arbitrary number of sides 59 (at least three, of course).

There are many kinds of mathematical functions that can be used to describe each region, including (but not limited to): constant radii (circular and spherical), conic and quadric, polynomials containing only even-powered terms, polynomials containing only odd-powered terms, full polynomials of a specified, but arbitrary, order, Zernike polynomials (used in optics), transcendental functions such as exponentials, trigonometric functions, and hyperbolic trigonometric functions, rational functions, Fourier series, and wavelets.

Given the mathematical description representing the posterior surface of the contact lens, the next step is to use ray tracing to determine the anterior surface of the lens such that the lens will provide the optics to correct the patient's vision. Note that the anterior surface is also a general spline surface with no assumptions of symmetry.

MODELING THE EDGE

Another use of the spline model is in the modeling of the edge of the contact lens. The primary source of discomfort is the interaction between the eyelid and edge of the lens. Consequently, the importance of good edge design is evident. Nonetheless, edge design is rather ad hoc and heuristic. The new approach to edge design uses spline mathematics with precise and repeatable control over the shape of the edge.

Having determined the anterior and posterior surfaces of the contact lens, a mathematical formulation is constructed to form the peripheral edge system (PES) of the contact lens to meet these surfaces with appropriate continuity.

There is no requirement or assumption that the anterior and posterior surfaces of the contact lens have the same diameters where they meet the peripheral edge system (PES); that is, it may be wider in either the anterior or posterior portion. For example, it may be useful to have a larger posterior surface diameter so as to match the corneal contour; alternatively, a larger anterior surface might serve optically to handle off-axis, oblique rays in the periphery.

Since there are no requirements or assumptions of symmetry, this peripheral edge system (PES) is itself a general surface in three dimensions. A special case of this formulation is a surface of revolution, where the edge has a constant cross-sectional curve shape.

The computation of the peripheral edge system (PES) can take into account the edge lift, specified as either the axial edge lift (AEL) or radial edge lift (REL) It can also use a new quantity defined here as tip lift (TL), the distance between the very tip of the edge and the tangent to the posterior surface. A large tip lift places the extreme point further from the posterior surface (and notionally the cornea).

Figure 9:
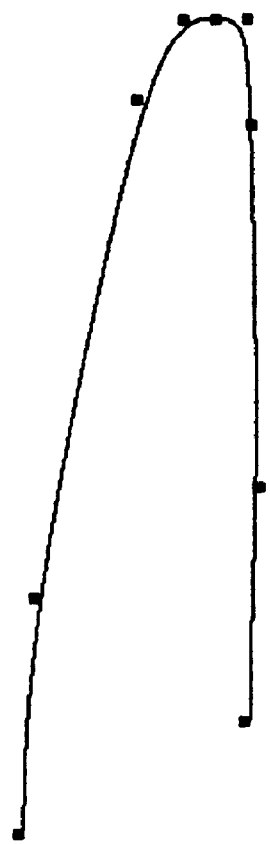
FIG. 9(ii) shows a spline designed low edge with small tip lift and anterior surface inwards.
Figure 9:
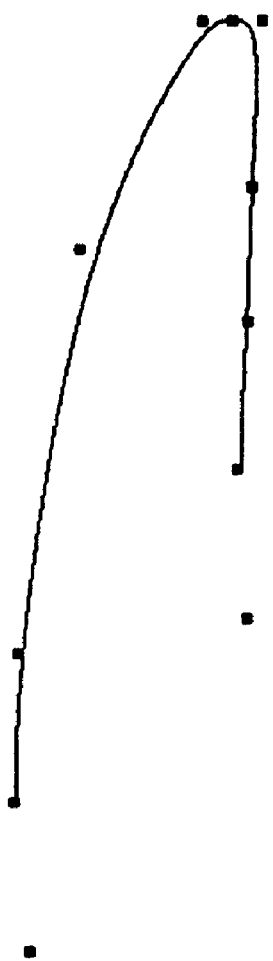
Figure 9:
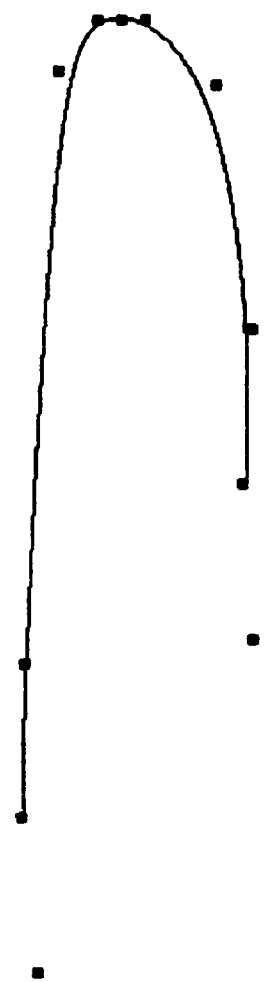

FIG. 9 shows an example, without limitation, of the design of a spline edge; the shape is specified by a mathematical description which is complete and precise, as well as repeatable. In this example, the edge is guaranteed to maintain continuous slope and curvature with the peripheral curve of the posterior surface as well as with the anterior surface.

In this example, all the edges shown are defined by uniform cubic B-spline curves in the plane and then rotated; however, the method is more general and would permit a non-rotationally symmetric edge surface in three dimensions.

In this example, the B-spline is specified by m+1 control vertices in the following manner: Three vertices control the position, first, and second derivative of the edge where it meets the anterior surface. These vertices are completely constrained by the position and shape of the anterior surface. Another three vertices control the meeting with the posterior surface, in the same way. Then, three more vertices control the position and derivative of the extreme tip of the edge. They are partially constrained to ensure that the point remains the maximal point.

In particular, for this example, these control vertices are determined in the following manner. The edge curve, Q(u), comprises the curve segments $Q_3(u), \ldots, Q_m(u)$.

For the beginning of the ith segment (i=3, . . . , m), $$Q_i(0) = \frac{V_{i-3} + 4V_{i-2} + V_{i-1}}{6} \qquad (3.1)$$

$$Q_i^{(1)}(0) = \frac{V_{i-1} - V_{i-3}}{2} \qquad (3.2)$$

where $V_i$ are control vertices.

The entire edge curve starts at $Q_3(0)$, which is given by:

$$Q_3(0) = \frac{V_0 + 4V_1 + V_2}{6} \qquad (4.1)$$

$$Q_3^{(1)}(0) = \frac{V_2 - V_0}{2} \qquad (4.2)$$

$$Q_3^{(2)}(0) = V_0 - 2V_1 + V_2 \qquad (4.3)$$

This can be equated to the position (denoted A), and first and second derivatives (denoted $A^1$ and $A^2$, respectively), of the anterior surface at the join point yielding the following conditions:

$$Q_3(0) = A \qquad (5.1)$$

$$Q_3^{(1)}(0) = A^1 \qquad (5.2)$$

$$Q_3^{(2)}(0) = A^2 \qquad (5.3)$$

Equating (4) and (5) yields three equations that can be solved for $V_0$, $V_1$, and $V_2$.

Similar equations for where the edge curve joins the posterior surface (at $Q_m(1)$) can be established and solved for $V_{m-2}$, $V_{m-1}$, and $V_m$.

The vertices $V_{m/2-1}$, $V_{m/2}$, and $V_{m/2+1}$ control the tip. The vertex $V_{m/2}$ is completely defined by the width, tip lift (TL) and coordinate system local to the edge. In the local system, $$V_{m/2} = (\text{width}, 0, TL). \qquad (6.1)$$

This can be transformed into a global system if required.

To ensure that this is the maximum point, the x- and y-coordinates in the local system of vertex $V_{m/2-1}$ are the same as the corresponding coordinates of $V_{m/2+1}$; the z-coordinate is used to control the derivative. Hence:

$$V_{m/2-1} = (\text{width}, 0, TL+d) \qquad (6.2)$$

$$V_{m/2+1} = (\text{width}, 0, TL-d) \qquad (6.3)$$

where d is some measure of the derivative.

The second derivative is 0 because the vertices $V_{m/2-1}$, $V_{m/2}$, and $V_{m/2+1}$ are collinear. More general constraints on $V_{m/2-1}$ and $V_{m/2+1}$ can incorporate tip curvature.

In this example, all the control vertices for the edge are expressed in a coordinate system that is defined by the position and tangent at the join with the posterior surface. The coordinate system is defined by the radial unit tangent vector to the posterior surface (pointing out from the center) (x-axis), a second "vertical" vector (z-axis) perpendicular to the radial unit tangent vector and in the plane of the edge curve, and a third vector (y-axis) perpendicular to these two, forming a right handed set. The origin is located at the join point with the posterior surface. The control vertices are expressed in this frame so that they move as the posterior surface is manipulated. This is also a very convenient way to define the tip position. The "width" of the edge is the maximum x-coordinate obtained by the edge curve. The "tip lift" and "tip curvature" are the z-coordinate and curvature, respectively, of the point with the the maximum x-coordinate.

This coordinate system in three dimensions enables a well-defined generalization from the usual planar edge context to three dimensions. Furthermore, by defining the mapping in terms of the posterior surface parameters, it is suitable for any posterior surface, without any assumptions about the shape.

This method enables the evaluation of the edge shape at every point around the lens, based on the local coordinate system there. The plane of the edge curve is not fixed in space but is determined in three dimensions from the posterior surface.

Figure 9V:
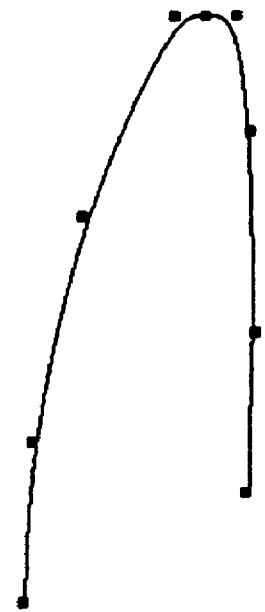
FIG. 9(v) shows a spline designed Mandell style edge.
Figure 9:
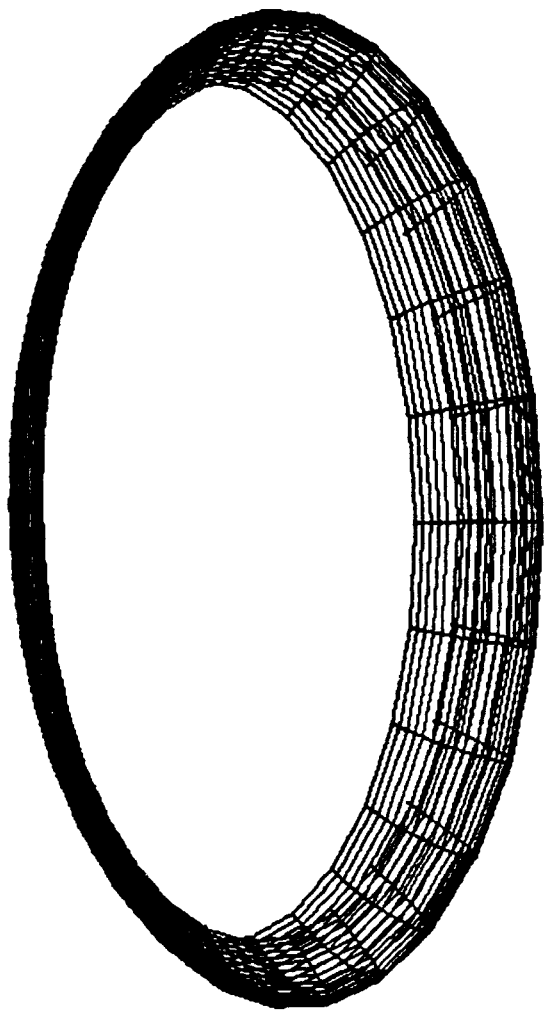

The edges shown in FIG. 9 all have m=10 and each has a different width and tip lift, giving a variety of appearances:

elongated edge (FIG. 9(i))
low edge with small tip lift and anterior surface inwards (FIG. 9(ii))
blunt edge (FIG. 9(iii))
Korb style edge [Korb, 1970] (large tip lift) (FIG. 9(iv))
Mandell style edge [Mandell, 1988] (FIG. 9(v))
Mandell style edge rotated (FIG. 9(vi))

MAIN STEPS IN THE METHOD

The new method provides a much wider class of shapes to be available to describe the anterior surface (including the optic zone), posterior surface, and peripheral edge system (PES) of a contact lens. Moreover, the new method enables contact lenses to be designed and fabricated so as to be a custom fit for patients whose corneas have complex or subtle shapes.

Figure 22:
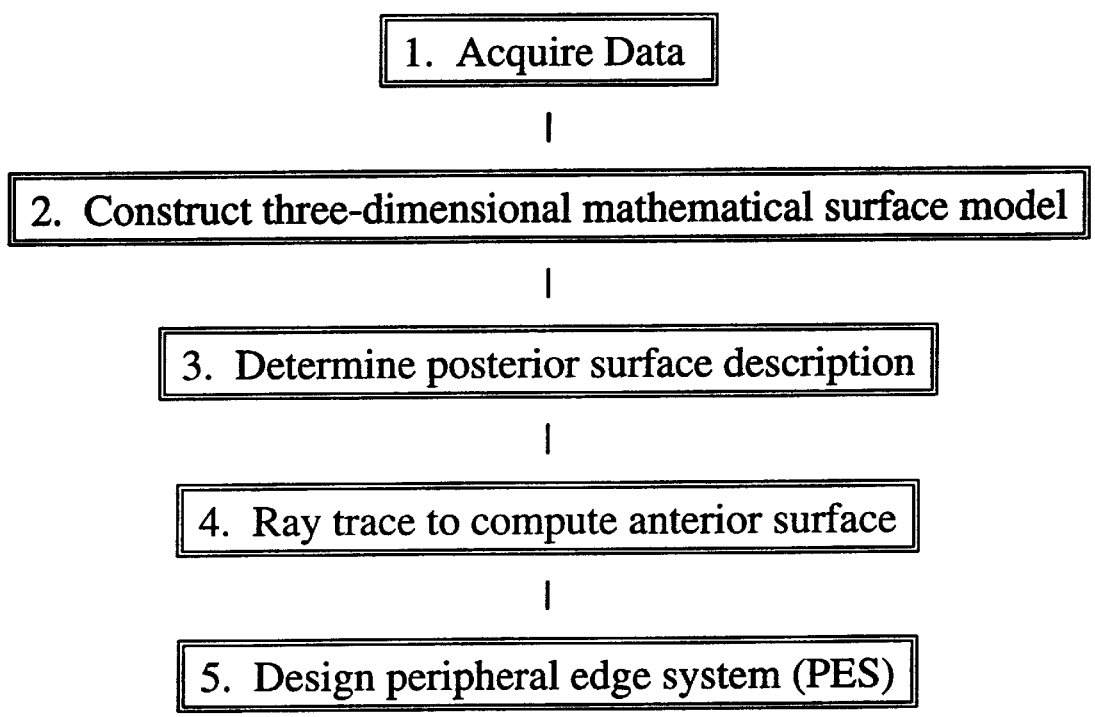
FIG. 22 shows a flowchart of the steps in the method.

Furthermore, rather than "guessing" with trial lenses from a limited set of available stock shapes, the new method enables contact lenses to be designed and fabricated so as to be a custom fit for patients whose corneas have complex or subtle shapes. The new method comprises some or all of the following steps (as shown in FIG. 22):

(1) Data acquisition. Data is obtained about the patient's cornea using a corneal topographic mapping system, sometimes called a "videokeratograph". There are, at present, a dozen or so such systems that are commercially available, as well as several others undergoing research and development. They are based on several different principles, but all share the intent to provide corneal shape information.

(2) Three-dimensional mathematical surface model construction. From the data obtained in (1), an accurate three-dimensional mathematical surface model of the patient's cornea is constructed. Note that the mathematical surface model has no requirements or assumptions of symmetry. (This model would generally also be a spline-based cornea model although non-spline-based corneas models could also be used.)

(3) Posterior surface description. From the mathematical model of the patient's cornea in (2), a mathematical description representing the posterior surface of the contact lens is developed. The calculation allows the insertion of a tear layer between the cornea surface and posterior surface. (This is particularly important in the case of rigid lenses.) This is done by adding "offset function" to the mathematical representation of the anterior surface cornea to yield the mathematical formulation for the posterior surface of the contact lens. As mentioned above, there are also no requirements or assumptions of symmetry, not even that the "footprint" of the contact lens be circular.

The lens should not fit tightly on the cornea, but instead there should be some movement of the lens on the eye. The shape of the posterior surface should not be identical to that of the cornea, but there should be a "lens-cornea relationship" involving a "mismatch" between the corneal surface and the back surface of the lens so as to have a tear layer between the cornea and contact lens. For a rigid lens, the tear layer varies from 10 to 20 microns at the center and 50 to 100 microns at the edge. It is much thinner and there is less movement in the case of soft lenses compared to rigid lenses. The movement of the lens and the volume of the tear layer play important roles in helping provide oxygen to the cornea during the wearing of a rigid contact lens. The thickness of the tear layer varies at different points under the contact lens. The optimal posterior surface shape depends on many factors including eyelid forces, surface tension, and tear viscosity. This involves the complex issues of how the contact lens moves and where it will rest on the eye. For a rigid lens, there is oscillation from an extremum position at the upper eyelid during a blink to an equilibrium position where the lens comes to rest after the eye has been open for at least 5 seconds. After the blink, the lens slowly drifts back to a balance-of-forces position. For a soft lens, there is less movement, a fact which can be exploited in creating soft lenses whose posterior surfaces more closely correspond to the corneal contour.

(4) Ray tracing for anterior surface. Given the posterior surface of the contact lens, ray tracing is used to define the anterior surface of the lens such that the lens will provide the optics to correct the patient's refractive error. The ray tracing yields a set of points on the anterior surface, and then a general spline surface (with no assumptions of symmetry) is fit to these points.

For example, but without limitation, the anterior surface can be calculated from the thickness of the contact lens, specified in the direction of the refracted ray inside the contact lens, expressed in terms of the coordinates of the posterior surface, in the case where the object is taken to be at infinity (incoming rays are all parallel) [Klein & Barsky, 1995].

The lens thickness, denoted $t_p$, at an arbitrary point, P, on the posterior surface is:

$$t_p = \frac{n_{lens}t_{ref} + n_{eye}(f-d) - n_{air}P}{n_{lens} - n_{air}\cos(\theta)} \quad (7)$$

where $n_{lens}$ is the index of refraction of the contact lens, $t_{ref}$ is the thickness of the contact lens along a reference ray, $n_{eye}$ is the composite index of refraction of the eye (combination of indices of refraction of the vitreous humor, crystalline lens, aqueous humor, cornea, and tear film), f is distance from the point where the reference ray hits the posterior surface to the focal point, d is the distance from the focal point to the point P on the posterior surface, $n_{air}$ is the index of refraction of air, and $\theta$ is the angle with respect to the incoming direction of the ray within the lens. This angle is calculated by tracing a ray from the focal point to the posterior surface and then using Snell's Law for general surfaces [Welford, 1986].

Note that the ray tracing approach to generate the anterior surface to achieve the optics avoids the usual assumption that the optical zone of the lens is spherical. Furthermore, in some cases, perfect spherical zones can be locally embedded in the spline surface shape (using, for example, rational splines).

(5) Peripheral edge system (PES) design. Given the posterior and anterior surfaces of the contact lens, a mathematical formulation of the edge is defined to meet these surfaces with appropriate continuity. An example, without limitation, of the derivation of the edge was given above.

DECOMPOSITION OF THE SURFACES OF THE LENS—DESCRIPTION OF FIGS. 10 TO 17

The new method provides a much wider class of shapes to be available to describe the anterior surface (including the optic zone), posterior surface, and peripheral edge system (PES) 58 of a contact lens. FIGS. 10 through 17 show, without limitation, some possible spline-based contact lenses. These lens correspond to the arrangements illustrated in FIGS. 1 through 8, respectively.

Figure 10:
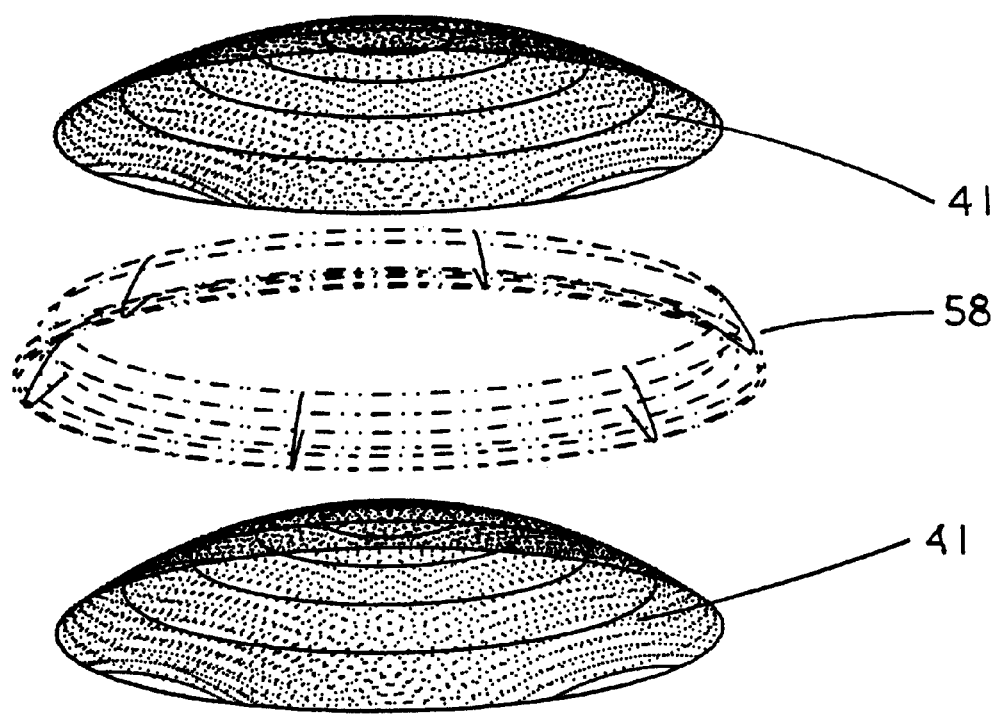
FIG. 10 shows a spline-based contact lens where the pieces are a sequence of annular regions.

(1) FIG. 10 shows the pieces as a sequence of annular regions (rings) 41.

Figure 11A:
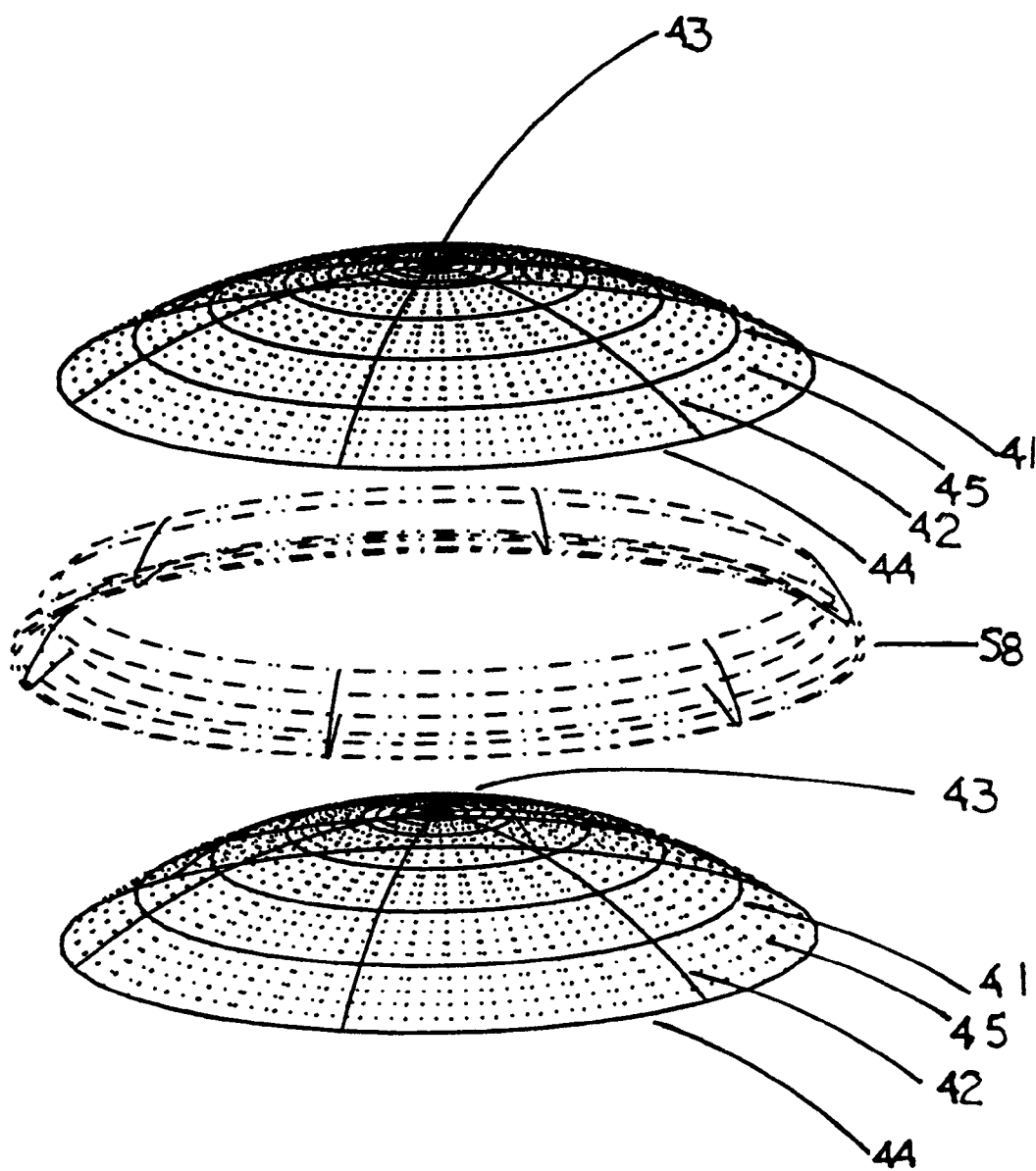
FIG. 11a shows a spline-based contact lens with radial lines emanating from the center.

(2a) FIG. 11a shows the aforementioned annuli further subdivided by adding a set of radial lines 42, emanating from the center 43, and terminating at the periphery 44, thereby forming a collection of four-sided regions 45, each bounded by two arcs 41 from the rings and two straight lines 42 from the radii.

Figure 11B:
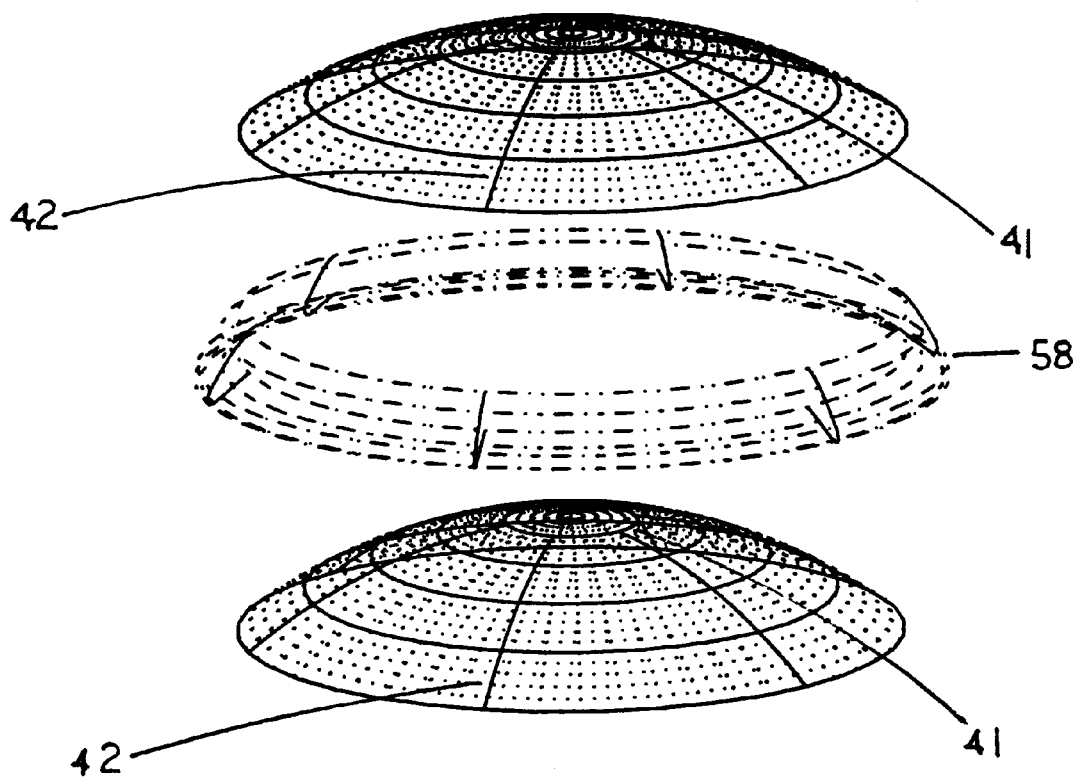
FIG. 11b shows a spline-based contact lens with radial lines starting at the same annular border.

(2b) FIG. 11b shows the set of radial lines 42 discussed in 2a emanating from the first annular border 41 rather than from the center.

Figure 11C:
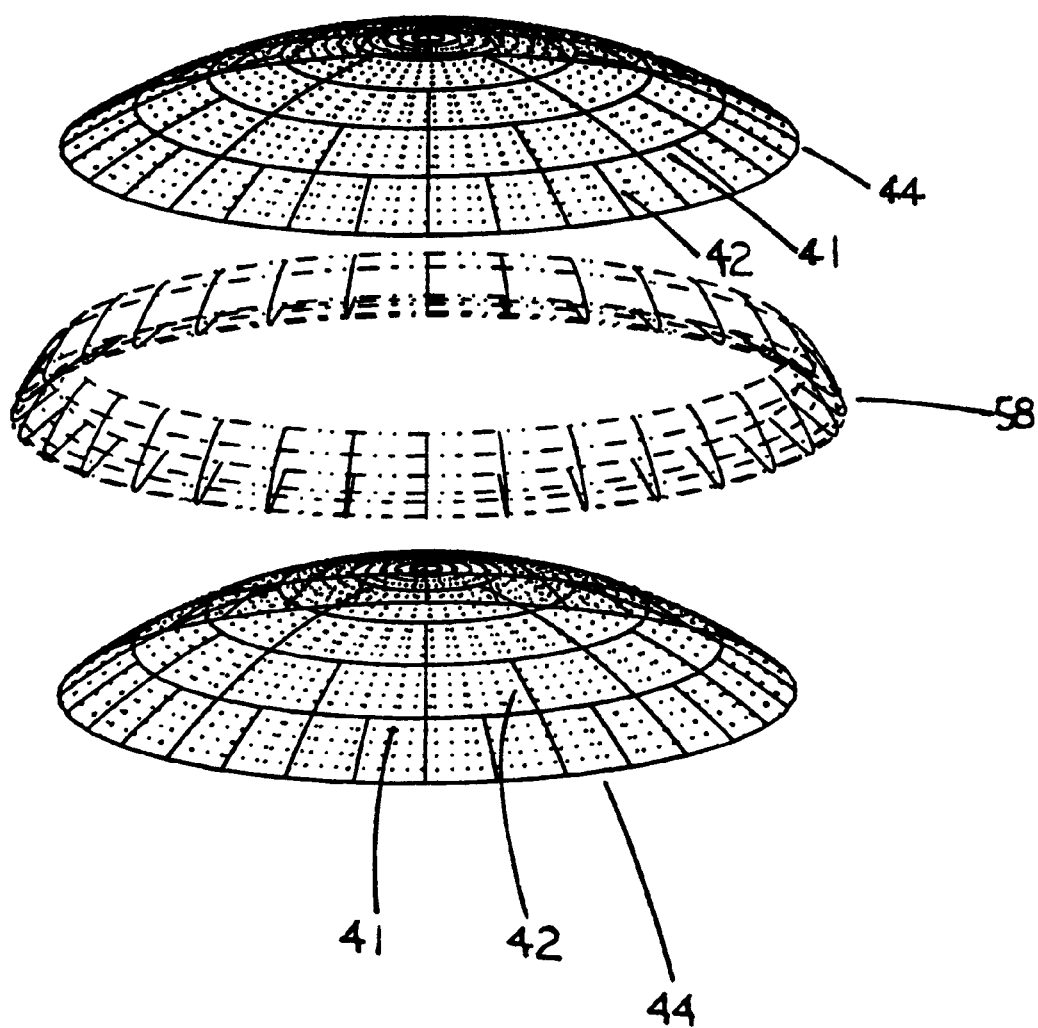
FIG. 11c shows a spline-based contact lens with radial lines emanating from various borders and terminating at the periphery.

(2c) FIG. 11c shows the set of radial lines 42 discussed in (2a) emanating from various annular borders 41, and terminating at the periphery 44.

Figure 11D:
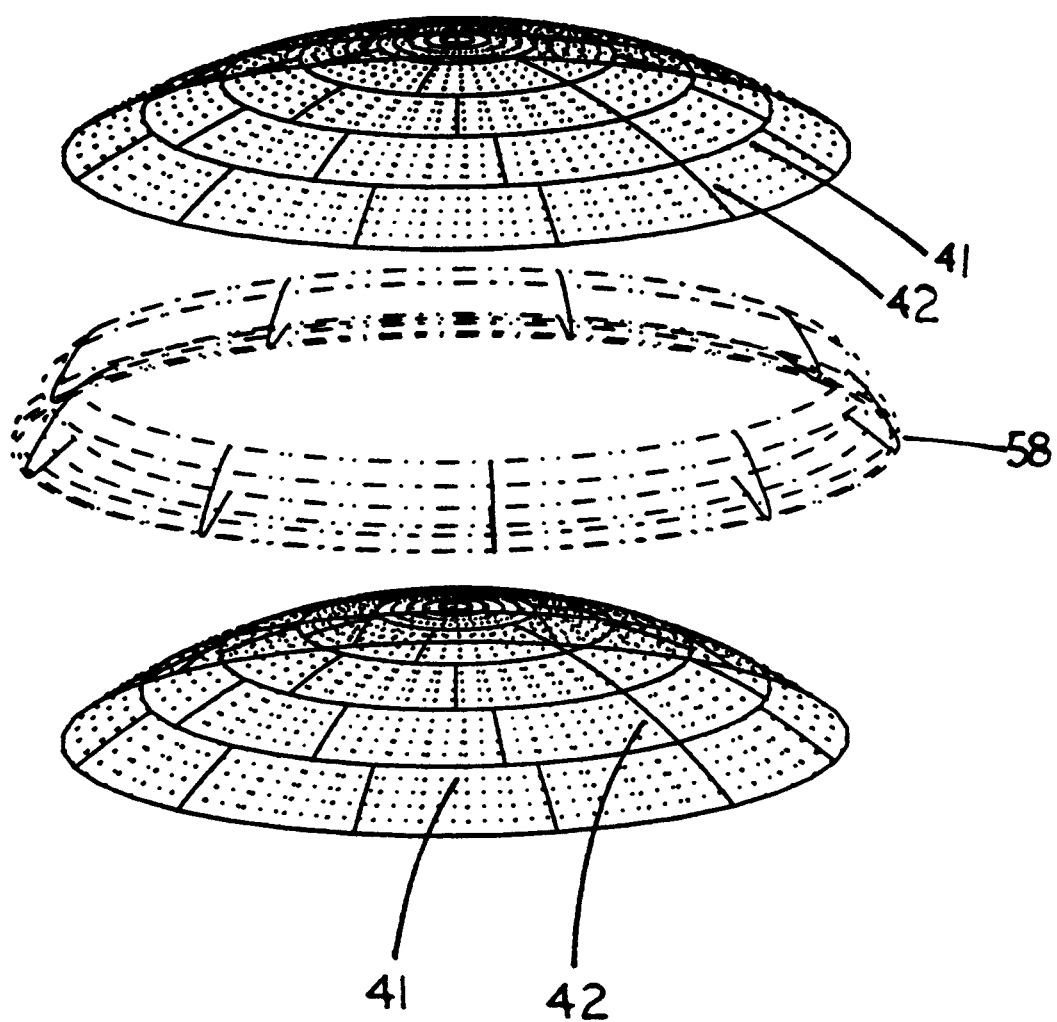
FIG. 11d shows a spline-based contact lens with radial lines, each of which may be between any pair of rings.

(2d) FIG. 11d shows the set of radial lines 42 discussed in (2a) emanating from various annular borders and terminating between various annular borders 41.

Figure 12:
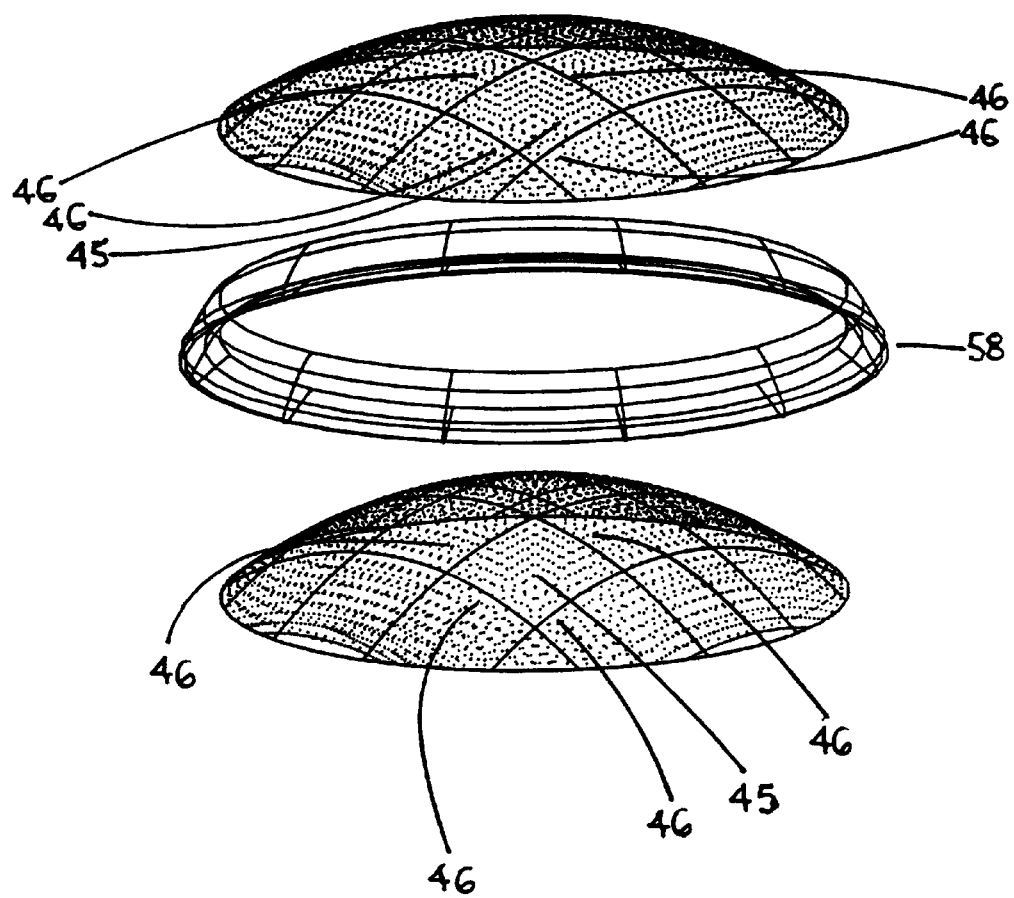
FIG. 12 shows a spline-based contact lens with a grid of four-sided regions formed by space curves extending across the entire surface.

(3) FIG. 12 shows a grid of four-sided regions 45, where each region is bounded by four space curves 46, and where each space curve extends across the entire surface.

Figure 13A:
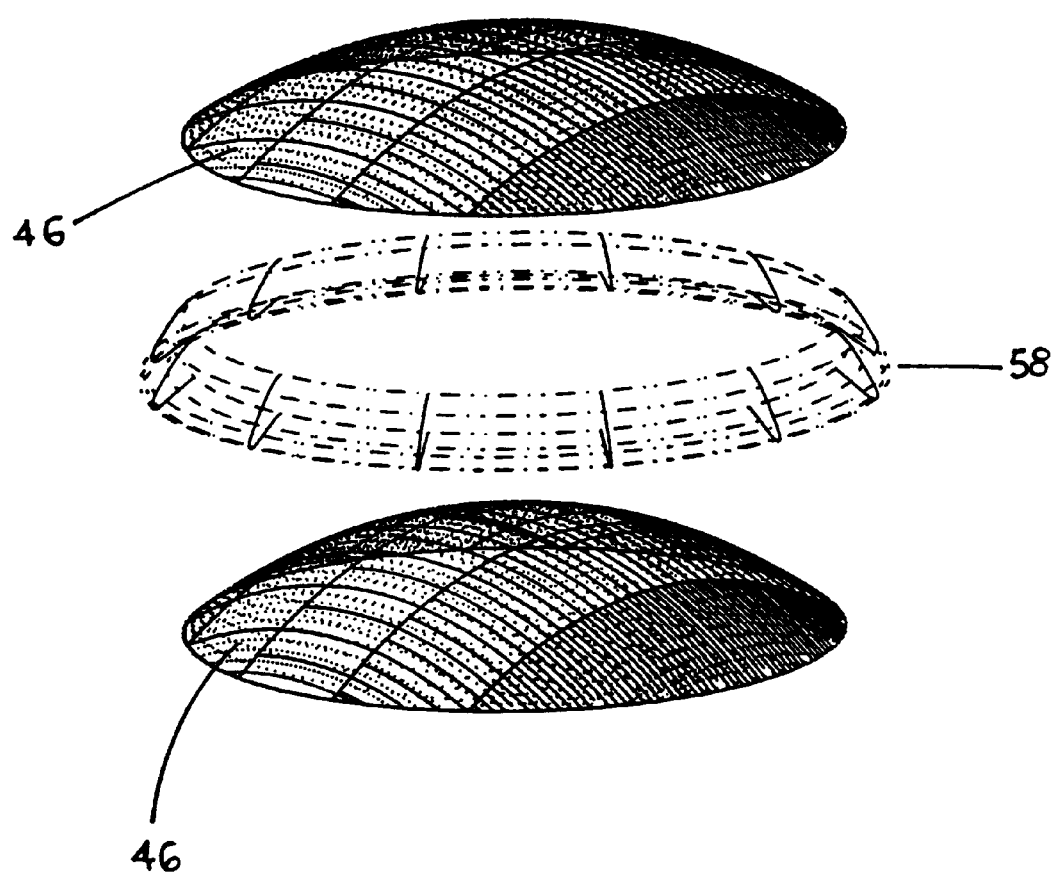
FIG. 13a shows a spline-based contact lens with a grid of four-sided regions where the number of such regions increases in each successive strip.

(4a) FIG. 13a shows a variant of the preceding one (3) where the space curves 46 in one direction are not required to extend across the entire surface so that the number and size of regions can be adaptive to shape, but where the number of such regions increases in each successive strip.

Figure 13B:
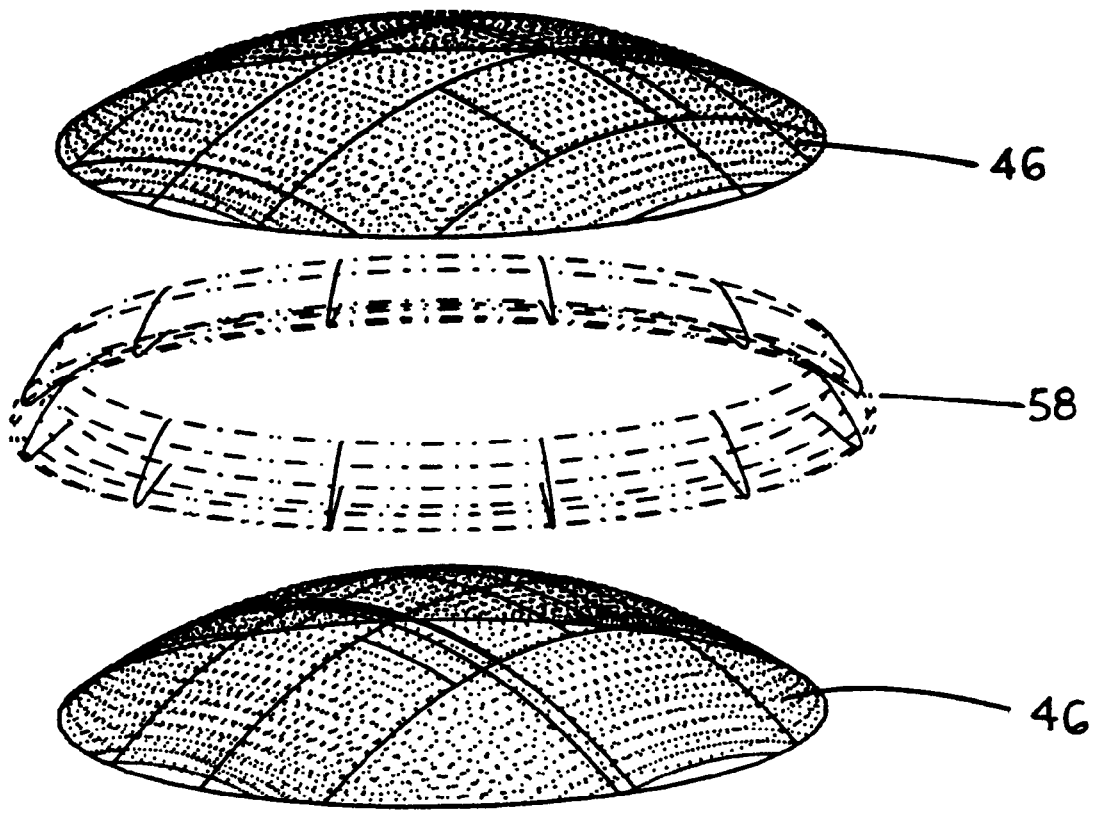
FIG. 13b shows a spline-based contact lens with a grid of four-sided regions where the number of such regions in each strip is independent of the number in the adjacent strips.

(4b) FIG. 13b shows a variant of (4a) where the number of such regions in each strip is independent of the number in the adjacent strips; that is, the space curves 46 in one direction may be between any pair of space curves in the other direction.

Figure 14:
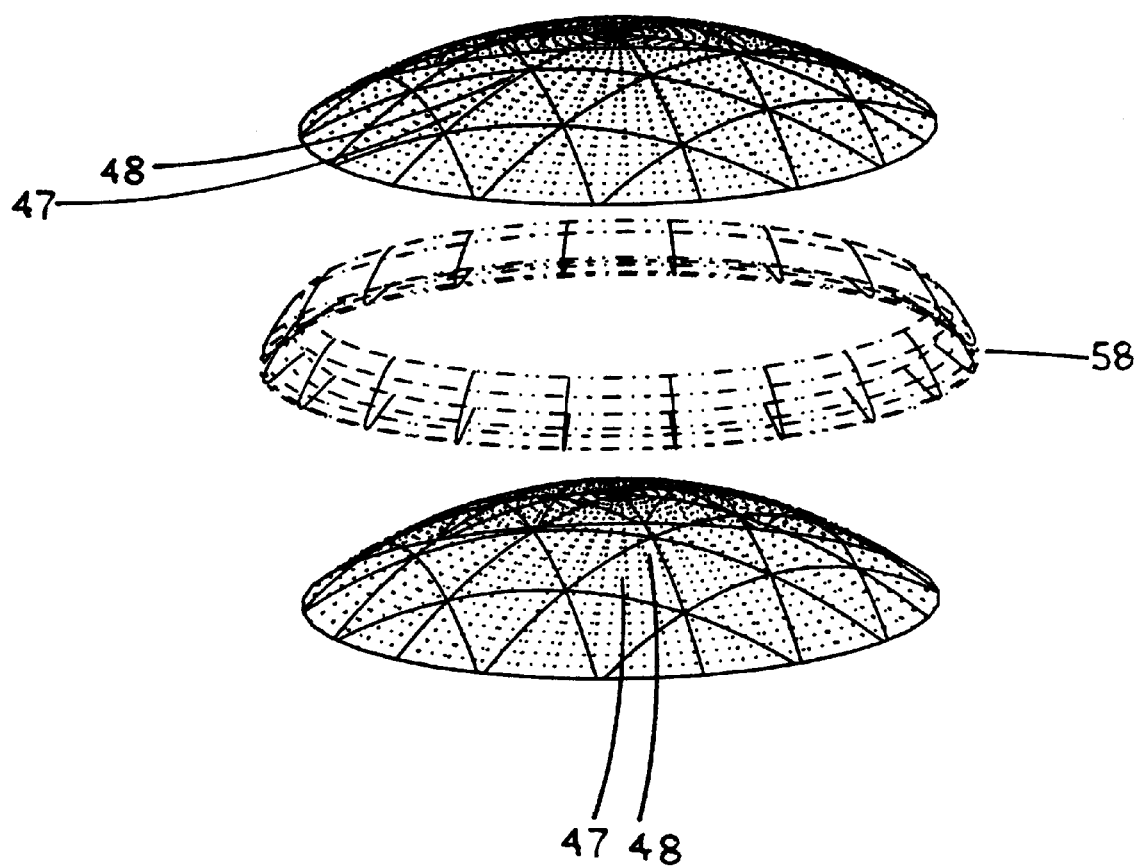
FIG. 14 shows a spline-based contact lens having a collection of equilateral triangular surface elements forming a hexagonal grid.

(5) FIG. 14 shows a collection of equilateral triangular surface elements 47, forming an hexagonal grid where all interior vertices 48 have exactly six edges emanating from them.

Figure 15:
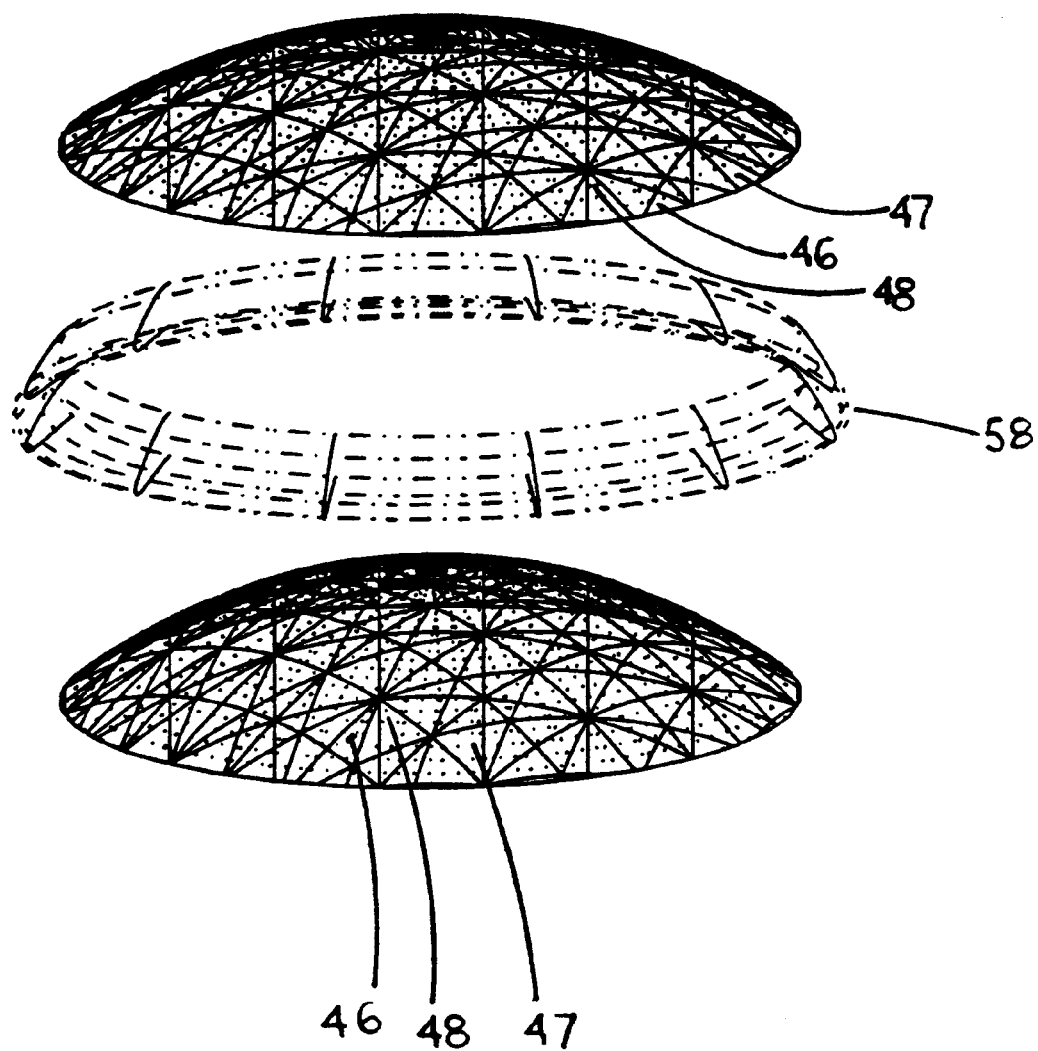
FIG. 15 shows a spline-based contact lens having a collection of general triangular surface element.

(6) FIG. 15 shows a collection of general triangular surface elements 47, that is, where each region is bounded by three space curves 46, and where an arbitrary number of edges may emanate from each vertex 48.

Figure 16:
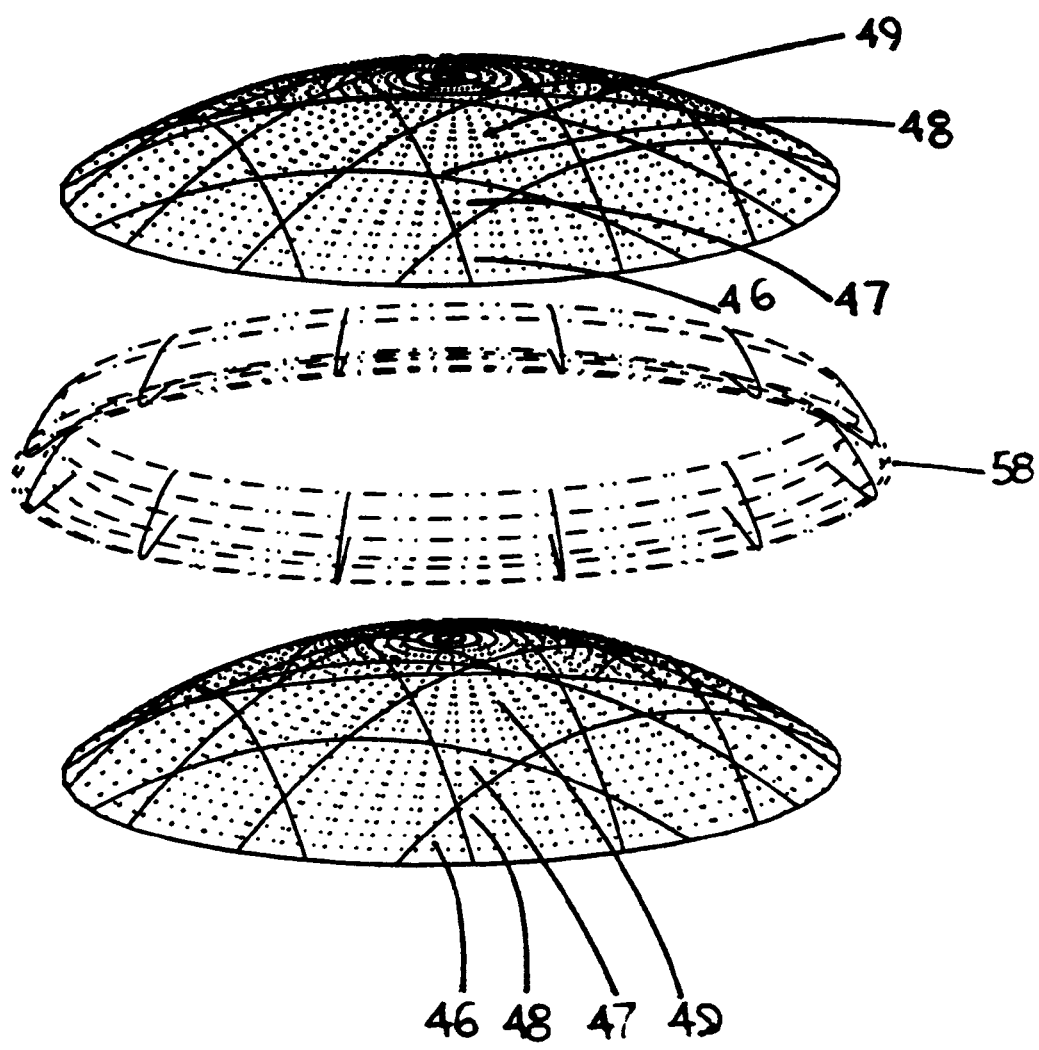
FIG. 16 shows a spline-based contact lens having a collection of triangular and hexagonal surface elements.

(7) FIG. 16 shows a collection of triangular 47 and hexagonal 49 surface elements, that is, where each region is bounded by either three or six space curves 46, and four edges emanate from each vertex 48.

Figure 17:
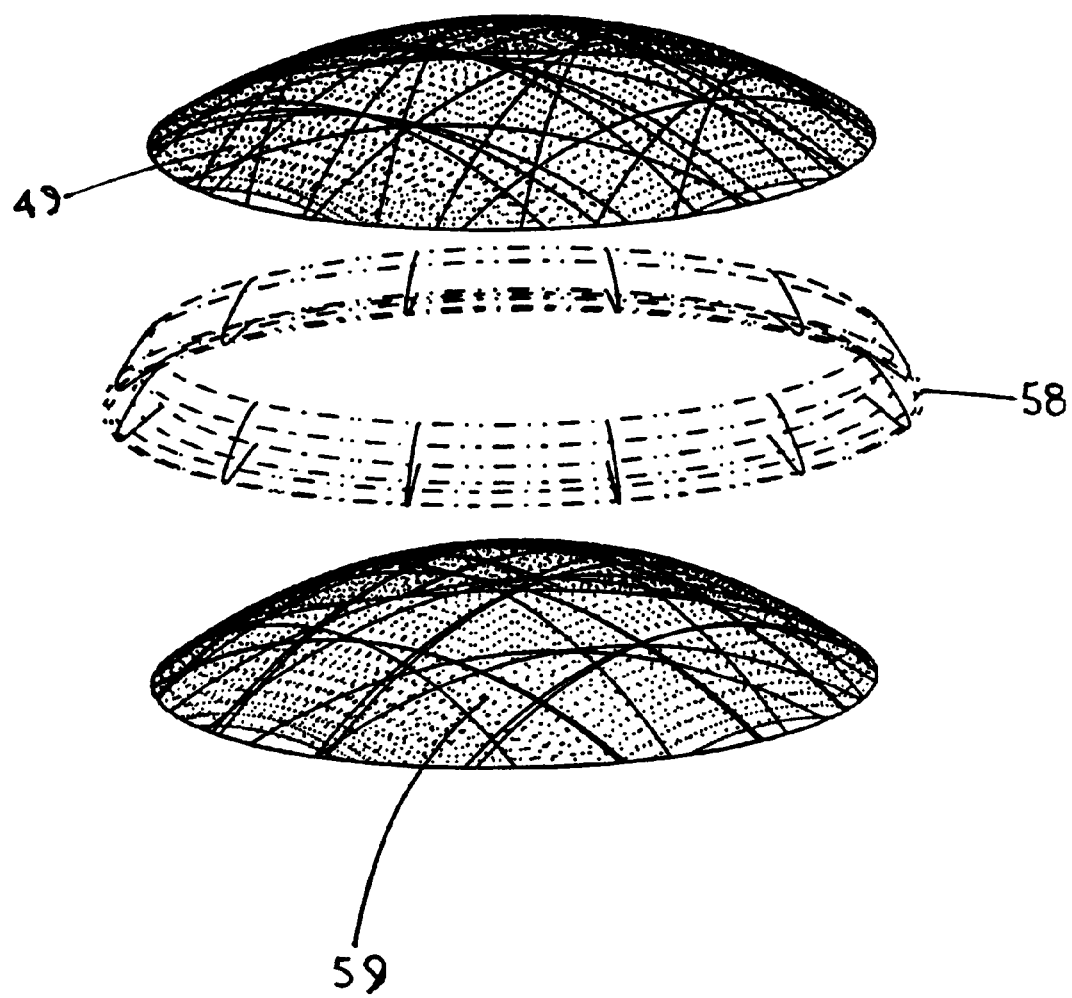
FIG. 17 shows a spline-based contact lens having a collection of regions, where each region can have an arbitrary number of sides.

(8) FIG. 17 shows a collection of regions, where each region can have an arbitrary number (at least three) of sides 59.

COMPUTERS AND NETWORKS

This method allows for spline-based contact lens design with or without corneal topography information being available. That is, this method is also applicable in the absence of precise information about the corneal contour. Even with nothing more than standard slit-lamp biomicroscopy, a posterior surface could be designed using this method.

The result of this method is a mathematical or algorithmic description of a contact lens. This can be used for data compression, transfer, exchange, conversion, formatting, etc. and for driving computer numerical control (CNC) manufacturing devices including, but not limited to, lathes, grinding and milling machines, molding equipment, and lasers.

Figure 18:
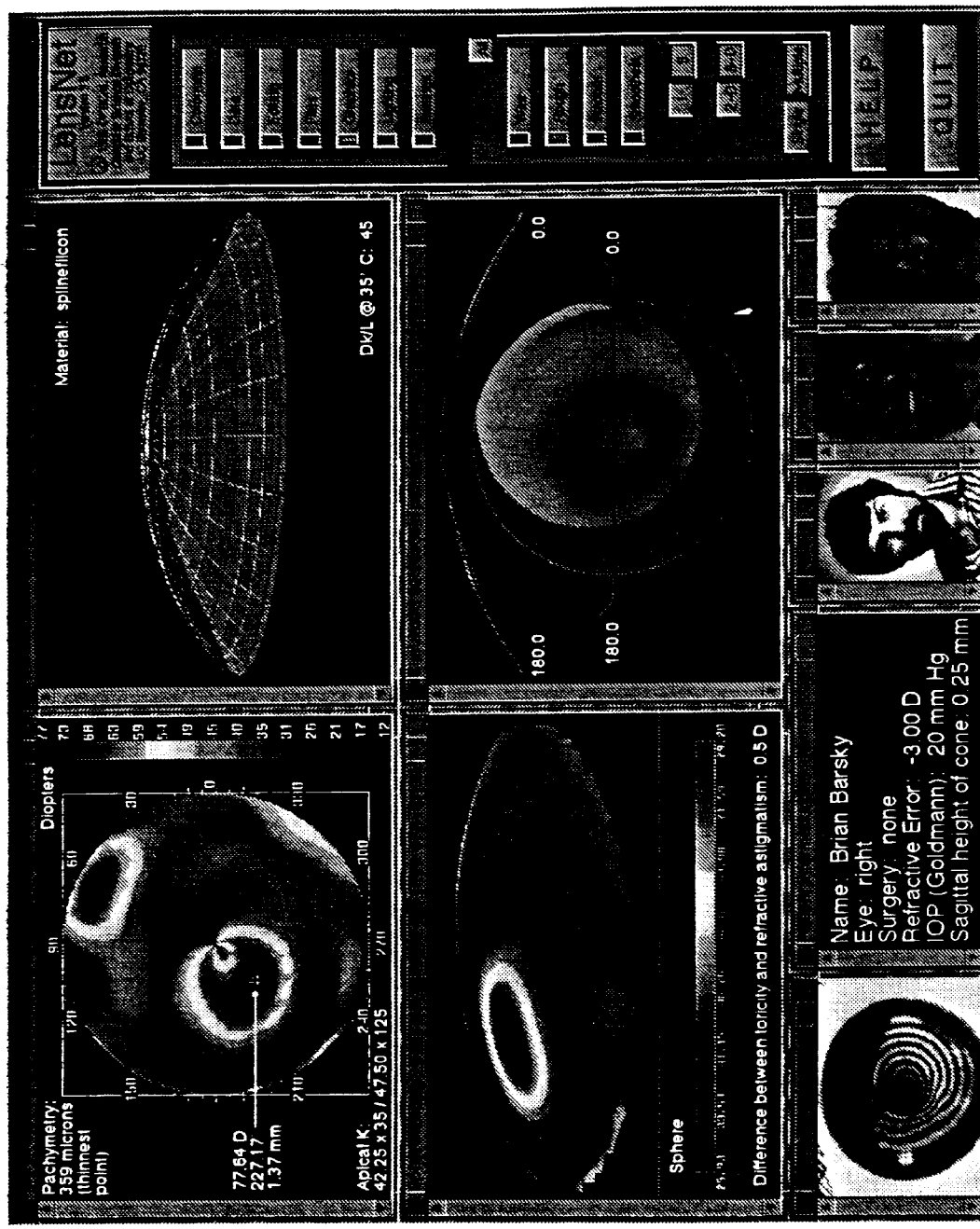
FIG. 18 shows a pilot system for a multi-window display. a three-dimensional surface representation of the cornea color-encoded

Such data can be used directly, or transferred over telephone lines via modems, or via computer networks. This approach enables patients to have their corneal topography analyzed in one location and a contact lens fabricated simultaneously or subsequently at a remote location. Both the corneal topography and the contact lens design could be displayed on the computer screen. FIG. 18 illustrates a pilot system for such a multi-window display. Clockwise, from the upper left, the windows show a corneal topographic map, a spline-based contact lens design, a simulated fluorescein pattern of that lens design on the patient's cornea, and a three-dimensional surface representation of the cornea color-encoded with the value of sphere.

SMOOTH TRANSITION ZONE

Another important application of spline-based contact lens design is the calculation of a smooth transition zone for the smoothing of the junction between two adjacent zones of the lens. The new approach involves splines, geometric continuity, and shape parameters to control the flattening of the shape of the transition zone of a contact lens.

In practice, this problem of discontinuities at the junction between zones is addressed by polishing; however, this process alters the specifications of the surface shape in an unknown, unpredictable, and unrepeatable way. Instead of this traditional approach, this new spline method replaces the discontinuous junction with a specially designed transition zone inserted between the two zones, with the important property of joining both zones smoothly. Furthermore, we can precisely quantify the degree of smoothness where the transition zone joins each adjacent zone. The constraints of smoothness or continuity can take any of a wide variety of forms as was described above.

Figure 19:
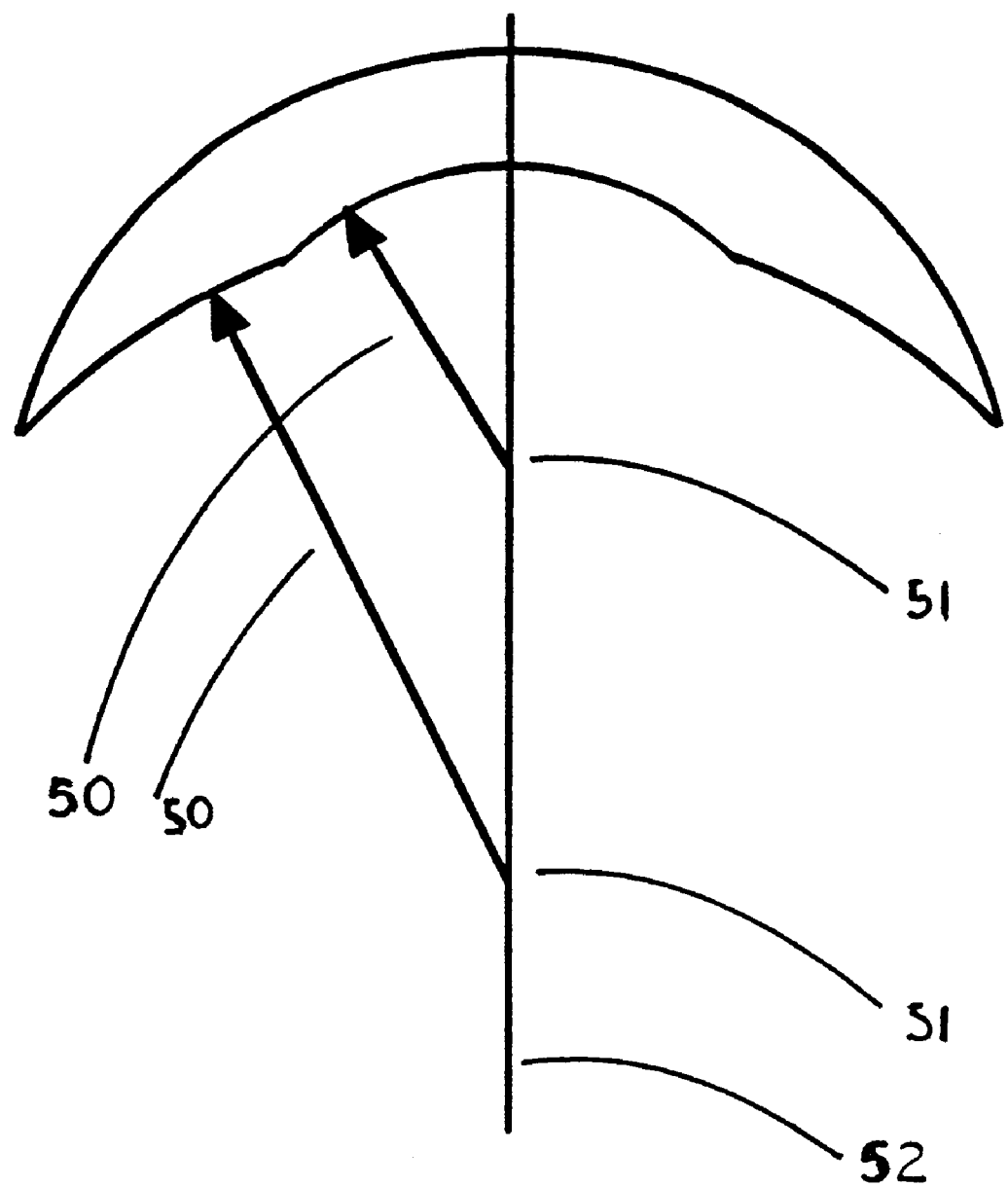
FIG. 19 shows a conventional lens surface where adjacent zones are both spherical, but of different radii and the centers of curvature lie along the axis of symmetry of the lens.

Mathematically, the geometry of a conventional lens surface, at a junction, is discontinuous in slope or curvature. Usually, the adjacent zones are both spherical, but of different radii 50, and the centers of curvature 51 lie along the axis of symmetry 52 of the lens (FIG. 19). This results in a discontinuity in slope and curvature at the junction. In the more complex case where one relaxes the constraint of co-axial centers of curvature, it is possible to achieve a continuous slope. It is a common misconception that a continuous slope is always sufficient for smoothness. Note, however, how the curvature will necessarily remain discontinuous at the junction.

Figure 20I:
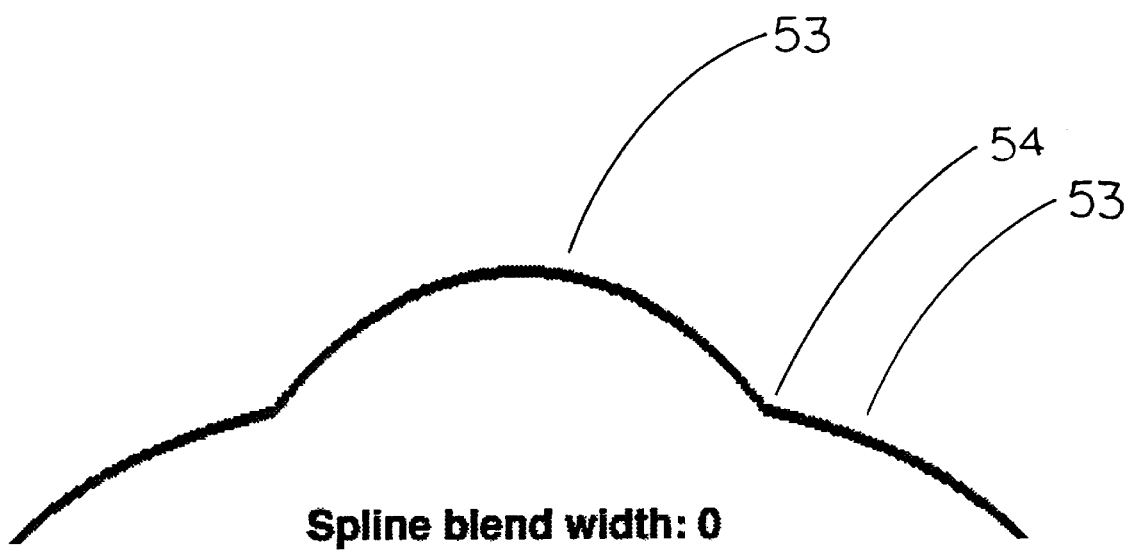
FIG. 20 (i) shows two conic (elliptical) zones.
Figure 20:
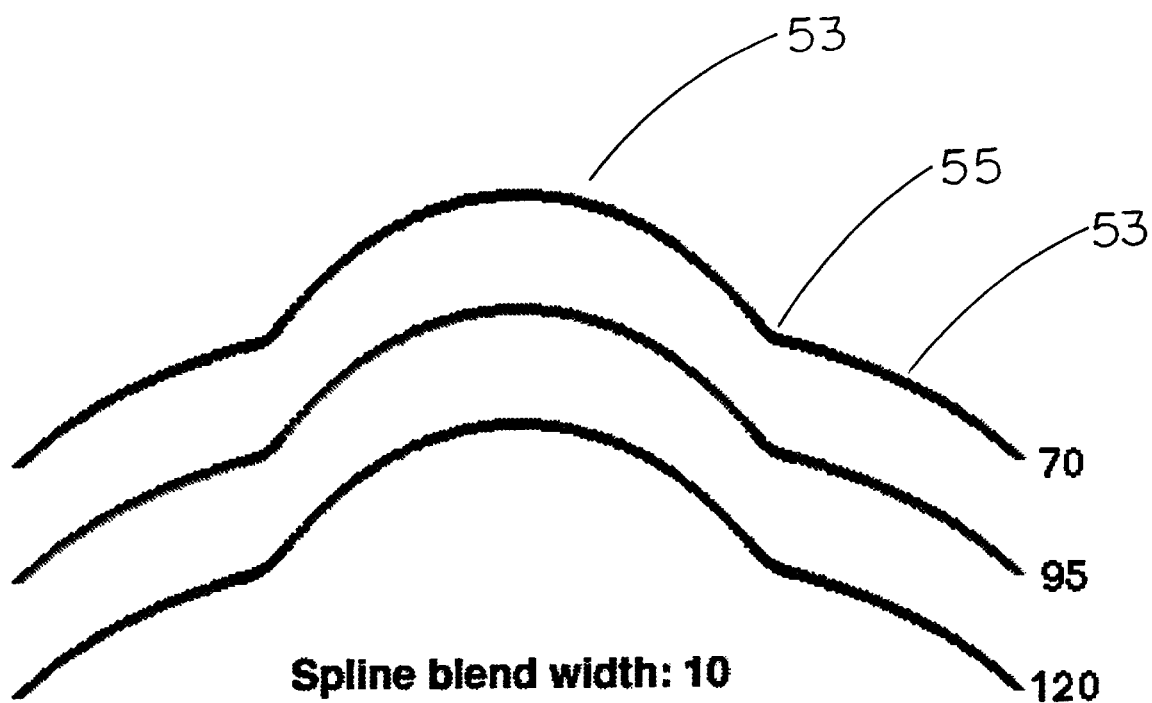
Figure 20V:
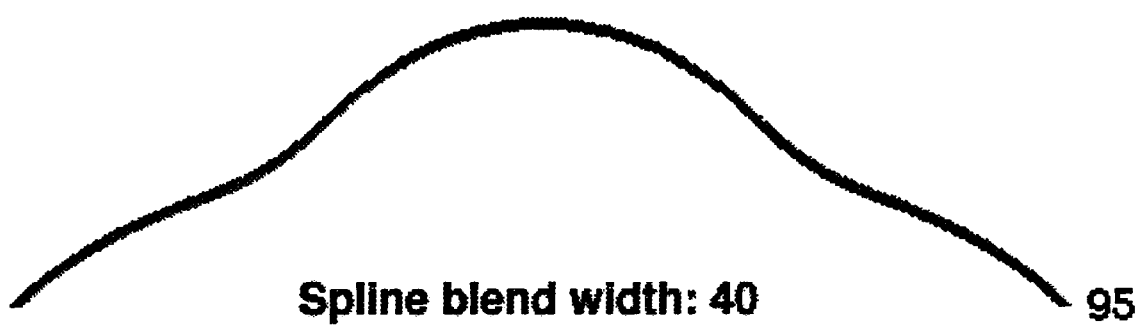

The transition zone is guaranteed to maintain a given level of continuity with the adjacent zones. As an example, but without limitation, FIG. 20 (*i*) shows two conic (elliptical) zones 53. The sharp area where they join 54 is replaced by a transition zone 55 which joins smoothly to both adjacent zones 53. In this example, this transition zone is a quintic polynomial. Furthermore, this formulation provides "shape parameters" that can be adjusted interactively to modify the shape in realtime [Barsky, 1988]. Both the "width" and "flatness" shape parameters of the zone can be independently controlled by the user, if desired. FIGS. 20 (*ii*)–(*iv*) shows several possible transition zones. In each of these three figures, there are three alternative transition zones 55 corresponding to different "flatness" values. FIGS. 20 (*ii*), (*iii*), and (*iv*) show small, medium, and large "width" transition zones, respectively. In all cases, this transition zone is guaranteed to maintain continuous slope and curvature with the adjacent zones. In FIG. 20 (*v*), the transition zone is shown in the same grey level as the adjacent zones, illustrating that one cannot detect where the transition zone joins its neighboring zones.

DESCRIPTION OF PARTICULAR PREFERRED EMBODIMENTS

Figure 21A:
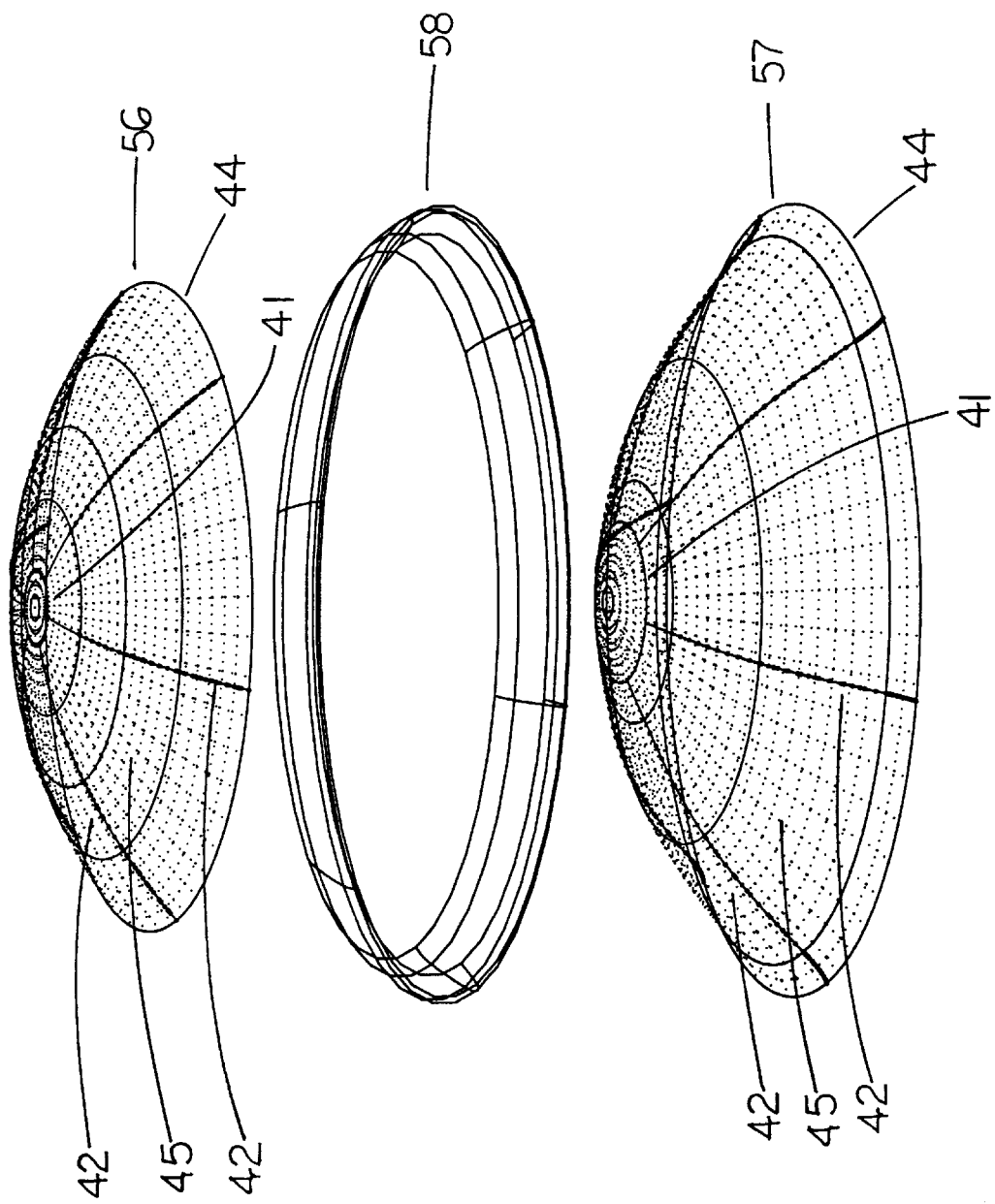
FIG. 21a shows a keratoconus lens with radial lines starting at the same annular border.

A primary application of spline-based contact lens design is the creation of contact lenses for keratoconus. These lenses need complex posterior surface shapes to accommodate the "cone". As an example, but without limitation, FIG. 21 shows such a keratoconus lens using spline-based mathematical geometry to describe the anterior surface 56, posterior surface 57, and peripheral edge system (PES) 58. The posterior surface has a local region of much higher curvature than the overall surface (minimum radius of curvature of 4.5 mm compared to overall radius of curvature of 7.67 mm) and yet the surface is smooth and the curvature continuously varies across the surface. In FIG. 21a, the surfaces are decomposed into pieces corresponding to FIGS. 2b and 11b, that is, a sequence of annular regions, which are further subdivided by adding a set of radial lines 42, emanating from a given annular border 41 and terminating at the periphery 44, thereby forming a collection of four-sided regions 45, each bounded by two arcs 41 from the rings and two straight lines 42 from the radii. In this figure, the radial lines divide each ring into six such regions. The annular boundaries on the anterior surface are at 4/9 mm, 12/9 mm, 20/9 mm, 28/9 mm, and 4 mm. For the posterior surface, the annular boundaries are at 1 mm, 1.5 mm, 3 mm, 4.5 mm, 4.9 mm. In general, the number of annular boundaries on the posterior surface is independent of that on the anterior surface.

Figure 21B:
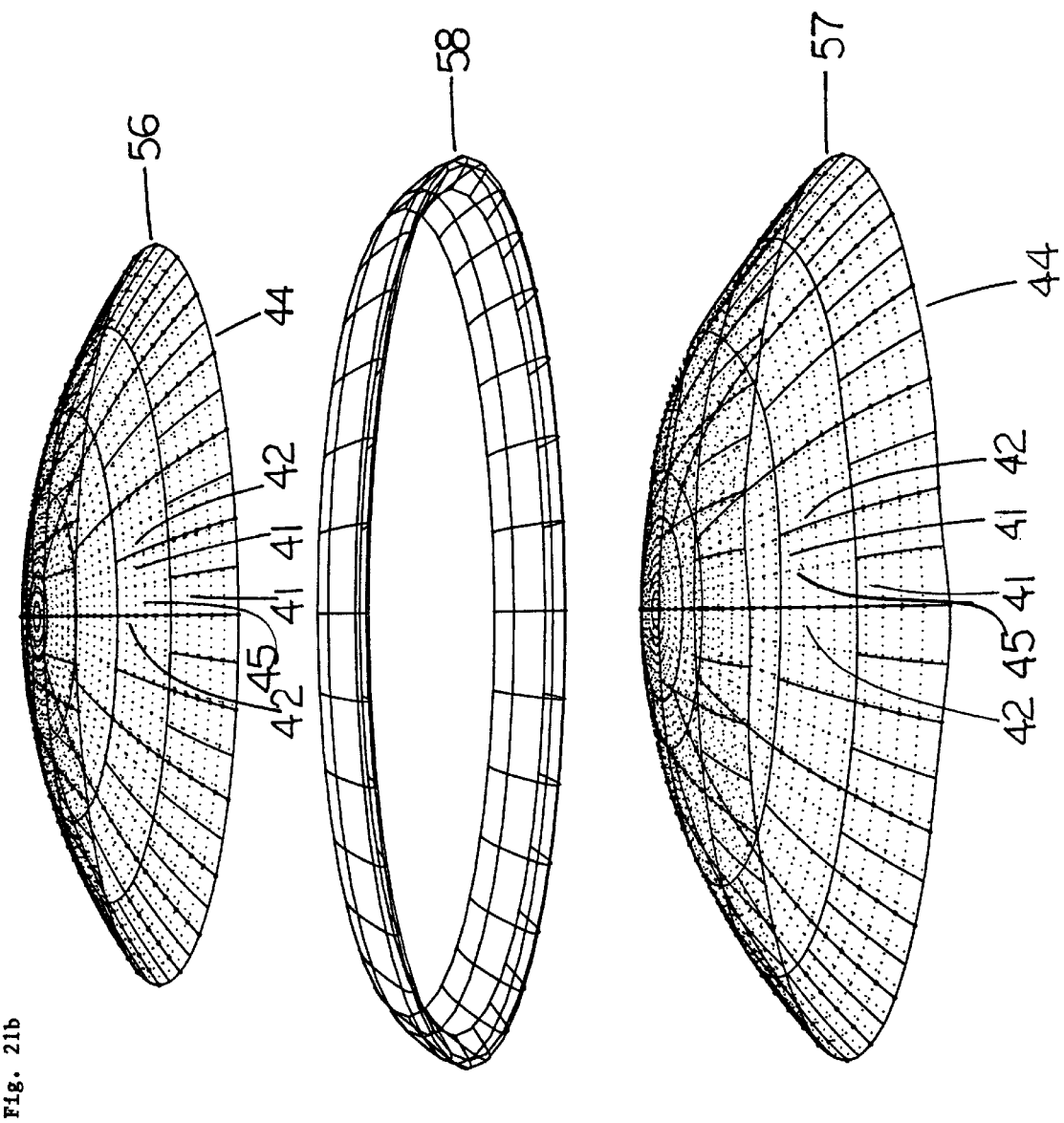
FIG. 21b shows a keratoconus lens with radial lines emanating from various borders and terminating at the periphery.
Figure 21C:
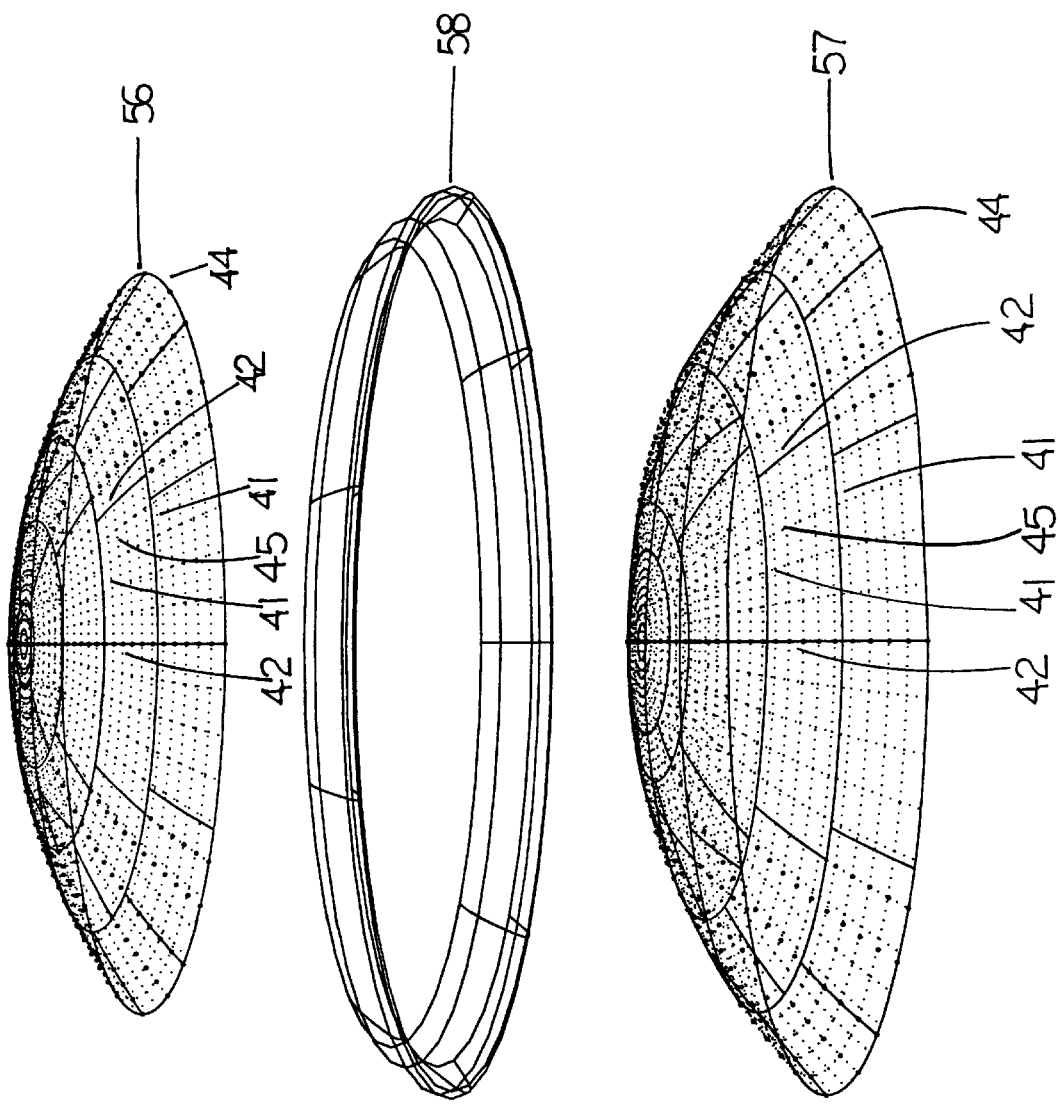
FIG. 21c shows a keratoconus lens with radial lines, each of which may be between any pair of rings.

FIGS. 21b and 21c are based on the arrangement corresponding to FIGS. 2c and 11c, that is, where the the set of radial lines 42 discussed in for the previous figure emanate from various annular borders 41, and terminating at the periphery 44. In FIG. 21b, the number of regions 45 doubles in successive rings; specifically, there are 4, 8, 16, and 32 regions in the first, second, third, and fourth rings, respectively. FIG. 21c has the number of regions 45 increasing by a unit increment in successive rings; that is, there are 6, 7, 8, and 9 regions in the first, second, third, and fourth rings, respectively. The annular boundaries for both FIGS. 21b and 21c are the same as in FIG. 21a.

Figure 21D:
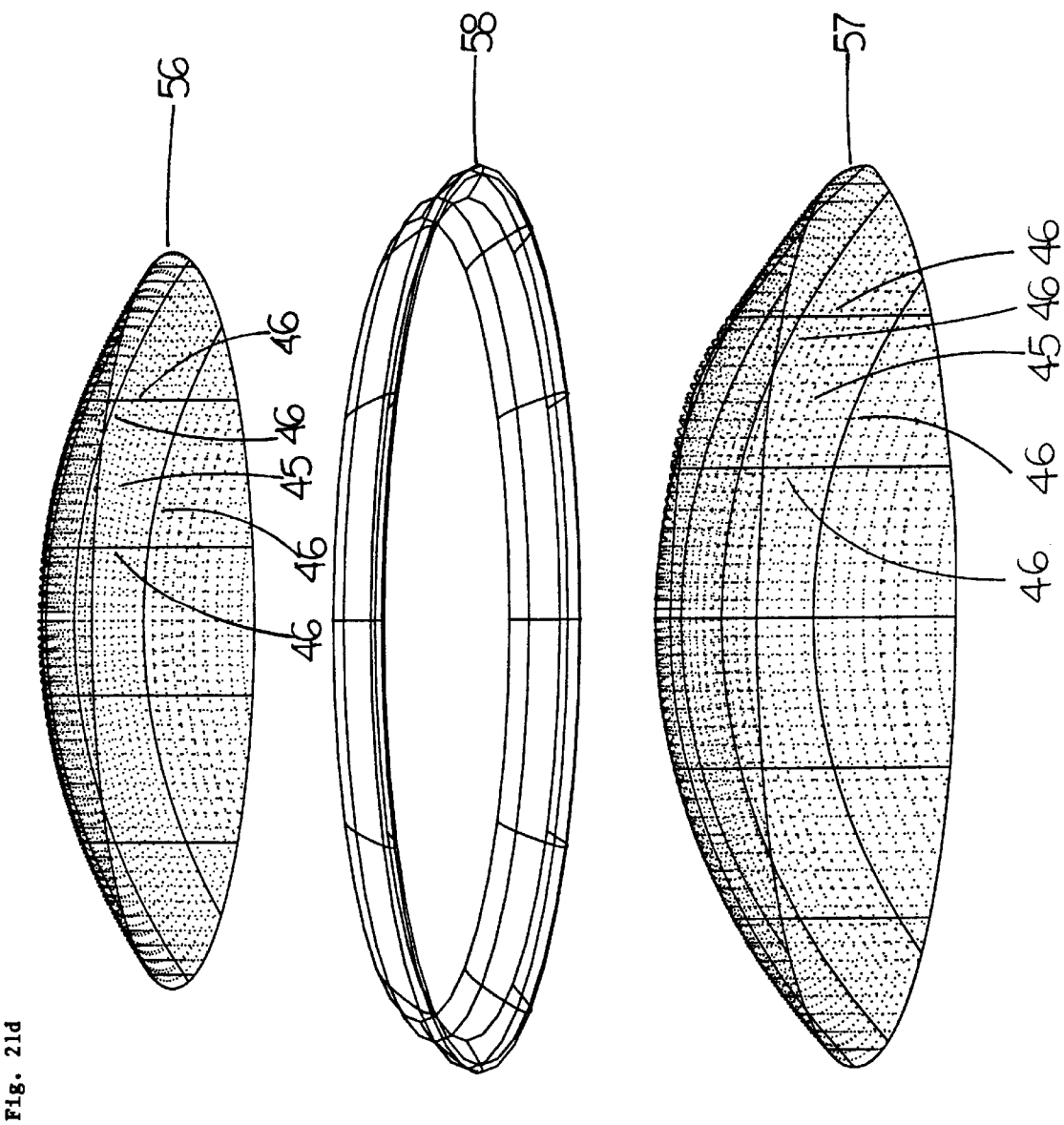
FIG. 21d shows a keratoconus lens with a grid of four-sided regions formed by space curves extending across the entire surface.

FIG. 21d corresponds to the formation described for FIGS. 3 and 12, that is, a grid of four-sided regions 45, where each region is bounded by four space curves 46, and where each space curve extends across the entire surface. The annular boundaries are the same as for FIGS. 21a, b, and c.

SUMMARY, RAMIFICATIONS, AND SCOPE

Thus, the reader will see that we have provided a method of contact lens design and fabrication using spline-based mathematical surfaces without restrictions of rotational symmetry. Splines can represent very general and complex shapes in a compact and efficient manner.

The novel techniques presented here enable the design and fabrication of contact lenses that transcend the state of the art. Based on the more powerful mathematical representation of splines, these contact lenses can have posterior surfaces that provide a good fit to corneas of complicated shapes. This enables the design of lenses (including soft lenses) with good optics for irregularly shaped corneas.

The present application describes a method that can accommodate higher order continuity, geometric continuity as well as parametric continuity, shape parameters, elimination of rotational symmetry restriction, spline-based optical zone (not constrained to be spherical), ability to embed exact spherical zones, eccentrically-located optical zone, complex-shaped tear layer gap ("mismatch"), and the capability to have non-circular periphery.

The mathematical pieces of the surface are not limited to cubic polynomials; they may be polynomials of any degree, polynomials containing only even-powered terms, polynomials containing only odd-powered terms, full polynomials of a specified, but arbitrary, order, Zernike polynomials (used in optics), or even non-polynomial functions (examples include, but are not limited to, rational, trigonometric, exponential, hyperbolic trigonometric, other transcendental functions, Fourier series, wavelets, etc.) as well as constant radii (circular and spherical), conics and quadrics.

The result of this method is a mathematical or algorithmic description of a contact lens. This can be used for data compression, transfer, exchange, conversion, formatting, etc. and for driving computer numerical control (CNC) manufacturing devices including, but not limited to, lathes, grinding and milling machines, molding equipment, and lasers.

Although the description above contains many specificities, these should not be construed as limiting the scope of the invention but as merely providing illustrations of some of the presently preferred embodiments. Many ramifications are possible, and some further applications of spline-based contact lens design will now be discussed.

The spline-based method has applications for the design and manufacture of both rigid and hydrogel (soft) contact lenses as well as for scleral contact lenses. It is appropriate for lenses that are either smaller, larger, or equal in size to the diameter of the cornea. The method has no limitation on the nature of the material. It has relevance to daily wear lenses, extended/flexible wear lenses, frequent/planned replacement lenses, daily/weekly disposable lenses lenses, aphakic lenses, prosthetic and therapeutic lenses, bifocal/multifocal lenses, toric lenses, and intra-ocular lenses.

In addition to the above-mentioned calculation of the posterior surface, anterior surface (including the optic zone), peripheral edge system (PES), and smooth transition zone, there are many other applications of spline-based contact lens design. These include, but are not limited to, the following:

computation of continuously varying thickness of a contact lens for prism ballasts for a non-rotationally symmetric lens computation of continuously varying thickness of a contact lens for optics for continuously varying index of refraction and/or for continuously varying materials use of splines to specify continuously varying optical power correction in a bifocal or multifocal lens; for example, varying radially out from the center or in the inferior/superior portions of the lens construction of "bosses" protruding from the anterior surface to interact with eyelid to provide stabilization for orientation of a non-rotationally symmetric lens etching of identifying marks on a lens for a wide variety of purposes, including (but not limited to): distinguishing left and right lenses, providing a mark to show correct orientation for a non-rotationally symmetric lens (e.g., at 6:00 o'clock position), marking a brand name, etc.

specification of extreme toric lenses (called "ultratorics"). Special splines are used to specify shapes similar to tori, for anterior and/or posterior surfaces (for hydrogel or rigid lenses). This would be particularly well-suited to corneas having high toricity, as well as for the correction of residual astigmatism using such surface shapes for both the anterior and posterior surfaces.

creation of custom disposable or frequent/planned replacement lenses. Although custom lenses are generally thought of as the antithesis of disposable or frequent/planned replacement lenses, this method uses the process of creating an inexpensive disposable mold of custom shape which is then used to mold a set of custom disposable or frequent/planned replacement lenses for a patient.

creation of a hydrogel lens with a complex irregular shape on the posterior surface to approximate the cornea, a simple (perhaps spherical) anterior surface, using a material with low index of refraction to approximate that of the tears and cornea (possibly by using a high-water content material). Such a lens would be indicated for irregularly-shaped corneas that currently could only be served by rigid contact lenses, if at all. Currently, hydrogel lenses drape over the cornea and result in poor optical surfaces for irregularly shaped corneas. Spline mathematics would allow the determination of surface shape such that the hydrogel lens placed on the cornea would provide optical correction.

creation of a contact lens that corrects the monochromatic aberrations of an eye. The anterior surface shape is determined to provide aberration-free optics and is represented as a spline surface.

creation of a contact lens with complex posterior surface shapes to accommodate astigmatism that is severe or irregular (non-orthogonal), and any corneal distortions which might arise from keratoconus, pellucid marginal degeneration, ectasia such as keratoglobus, post-trauma, micropsia, pterygium, and scarring from ulcerative keratitis, etc.

creation of a contact lens with complex posterior surface shapes to accommodate post-surgical corneas including penetrating keratoplasty (PK) grafts as well as corneal refractive surgery failures (for example, but not limited to, radial keratotomy (RK), photorefractive keratectomy (PRK), automated lamellar keratoplasty (ALK), and laser in-situ keratomileusis (LASIK)).

creation of contact lens for use as an erodible mask for shape transfer in laser surgery such as PRK creation of a sequence of contact lenses of varying shapes for use in orthokeratology creation of contact lenses for use as molds in Precision Corneal Molding (PCM), Controlled Kerato-Reformation (CKR), and orthokeratology appended claims and their legal equivalents, rather than by the examples given.

Thus, the scope of the invention should be determined by the appended claims and their legal equivalents, rather than by the examples given.

I claim:

1. A method of contact lens design using one or a plurality of piecewise functions that satisfy a set of associated constraints of smoothness, where the contact lens is specified by said piecewise functions, and where said method is applicable to rotationally symmetric surfaces or non-rotationally symmetric surfaces or both rotationally symmetric and non-rotationally symmetric surfaces.

2. The method of claim 1 where the posterior surface of the contact lens is calculated from corneal topographic data.

3. The method of claim 1 where the anterior surface of the contact lens is determined by ray tracing to provide optical correction.

4. The method of claim 1 where the peripheral edge system is a piecewise function with associated constraints of smoothness.

5. The method of claim 1 where said piecewise functions are selected from the group comprising constant radii, conic curves and quadric surfaces, polynomials containing only even-powered terms, polynomials containing only odd-powered terms, full polynomials of a specified, but arbitrary, order, Zernike polynomials, Taylor series, non-polynomial functions, rational functions, trigonometric functions, exponential functions, hyperbolic functions, hyperbolic trigonometric functions, transcendental functions, Fourier series, and wavelets.

6. The method of claim 1 where said constraints of smoothness are selected from the group comprising parametric, geometric, and Frenet frame continuity of arbitrarily high order.

7. The method of claim 1 where the decomposition of each surface into smaller pieces has topology from the group of:

(i) pieces as a sequence of annular regions, that is, rings, (ii) pieces as a sequence of annular regions, that is, rings, where said rings are further subdivided by superimposing a set of radial lines, thereby forming a collection of four-sided regions, each bounded by two arcs from the rings and two straight lines from the radii, (iii) a plurality of four-sided regions, where each region is bounded by four space curves, (iv) a plurality of equilateral triangular surface elements, (v) a plurality of general triangular surface elements, whereby each region is bounded by three space curves, and whereby an arbitrary number of edges may emanate from each vertex, (vi) a plurality of triangular and hexagonal surface elements, that is, where each region is bounded by either three or six space curves, and four edges emanate from each vertex, and (vii) a plurality of regions, whereby each region has three or more sides.

8. The method of claim 1 for the production of an inexpensive disposable mold of custom shape which is then used to mold a set of custom disposable or frequent/planned replacement lenses.

9. The method of claim 1 where the thickness of the contact lens continuously varies thereby enabling any of those in the group of (i) integration of prism ballasts thereby providing stabilization for orientation of a non-rotationally symmetric lens, (ii) construction of bosses protruding from the anterior surface to interact with eyelid thereby providing stabilization for orientation of a non-rotationally symmetric lens (iii) optics for continuously varying index of refraction, (iv) optics for continuously varying materials, and (v) etching of identifying marks on a lens.

10. The method of claim 1 where said functions possess shape parameters.

11. The method of claim 1 where a smooth transition zone is inserted between two adjacent zones of the lens.

12. A contact lens whose shape is described by one or a plurality of piecewise functions with associated constraints of smoothness, where the set of possible surfaces described by said functions includes but is not limited to rotationally symmetric surfaces.

13. The lens of claim 12 comprising a complex irregular shape on the posterior surface to approximate the cornea.

14. The lens of claim 12 comprising a simple anterior surface using a material with low index of refraction to approximate that of the tears and cornea.

15. The lens of claim 12 where the anterior surface shape is determined to correct monochromatic aberrations of an eye.

16. The lens of claim 12 for use as an erodible mask for shape transfer in laser corneal surgery.

17. The lens of claim 12 as a mold for Precision Corneal Molding (PCM), Controlled Kerato-Reformation (CKR), and orthokeratology.

18. The lens of claim 12 comprising varying optical power correction thereby producing a bifocal or multifocal lens.

19. The lens of claim 12 having a non-circular periphery thereby enabling an oval shape or truncated portion.

20. A system for contact lens fabrication using one or a plurality of piecewise functions that satisfy a set of associated constraints of smoothness, where the contact lens is specified by said piecewise functions, and where said method is applicable to rotationally symmetric surfaces or non-rotationally symmetric surfaces or both rotationally symmetric and non-rotationally symmetric surfaces:

(i) acquisition of topographic data of a cornea, (ii) construction of three-dimensional mathematical surface model of said cornea, (iii) determination of the posterior surface of a contact lens resulting from insertion of a tear layer between the cornea surface and posterior surface, (iv) computation of the anterior surface of the contact lens to provide optics, and (v) fabrication of said lens using a computer numerical control manufacturing device selected from the group comprising lathes, grinding and milling machines, molding equipment, and lasers.

* * * * *

UNITED STATES PATENT AND TRADEMARK OFFICE
CERTIFICATE OF CORRECTION

PATENT NO. : 6,241,355 B1
DATED : June 5, 2001
INVENTOR(S) : Brian A. Barsky

It is certified that error appears in the above-identified patent and that said Letters Patent is hereby corrected as shown below:

Title page,
In "Other Publications", four books that were included with the submitted specification of the patent were omitted from the printed version of the patent:

Brian A. Barsky, *Computer Graphics and Geometric Modeling Using Beta-splines,* Springer-Verlag, Heidelberg, 1988.

Richard H. Bartels, John C. Beatty, and Brian A. Barsky, *An Introduction to Splines for Use in Computer Graphics and Geometric Modeling,,* Morgan Kaufmann Publishers, Inc., San Francisco, California, 1987.

Robert B. Mandell, *Contact Lens Practice,* Fourth edition, Charles C. Thomas, Springfield, IL, 1988.

W. T. Welford, *Aberations of Optical Systems,* Adam Hilger Ltd, Bristol, 1986.

Signed and Sealed this

Twenty-seventh Day of November, 2001

*Attest:*

NICHOLAS P. GODICI
*Attesting Officer*   Acting Director of the United States Patent and Trademark Office